United States Patent
Iqbal et al.

(10) Patent No.: US 12,120,128 B1
(45) Date of Patent: Oct. 15, 2024

(54) ROUTE AND PACKET FLOW EVALUATION ON A CLOUD EXCHANGE

(71) Applicant: Equinix, Inc., Redwood City, CA (US)

(72) Inventors: Syed Hashim Iqbal, San Jose, CA (US); Muhammad Durrani, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 457 days.

(21) Appl. No.: 16/945,089

(22) Filed: Jul. 31, 2020

(51) Int. Cl.
| | |
|---|---|
| *H04L 29/06* | (2006.01) |
| *G06N 5/04* | (2023.01) |
| *G06N 20/00* | (2019.01) |
| *H04L 9/40* | (2022.01) |
| *H04L 45/02* | (2022.01) |
| *H04L 67/141* | (2022.01) |

(52) U.S. Cl.
CPC ............. *H04L 63/126* (2013.01); *G06N 5/04* (2013.01); *G06N 20/00* (2019.01); *H04L 45/02* (2013.01); *H04L 63/101* (2013.01); *H04L 67/141* (2013.01)

(58) Field of Classification Search
CPC ..... H04L 63/126; H04L 45/02; H04L 63/101; H04L 67/141; G06N 20/00; G06N 5/04
USPC ............................................................ 726/3
See application file for complete search history.

(56) References Cited

U.S. PATENT DOCUMENTS

| | | |
|---|---|---|
| 7,854,001 B1 | 12/2010 | Chen et al. |
| 8,018,873 B1 | 9/2011 | Kompella |
| 8,046,490 B1 * | 10/2011 | Wu .......................... H04L 45/00 709/224 |
| 8,327,002 B1 | 12/2012 | Van Dussen et al. |
| 8,909,736 B1 | 12/2014 | Bosch et al. |
| 8,954,491 B1 | 2/2015 | Medved et al. |
| 9,886,267 B2 | 2/2018 | Maheshwari et al. |
| 9,935,816 B1 | 4/2018 | Chen et al. |
| 9,948,552 B2 | 4/2018 | Teng et al. |
| 10,129,078 B2 | 11/2018 | Kumar et al. |

(Continued)

FOREIGN PATENT DOCUMENTS

| | | |
|---|---|---|
| CN | 108886521 A | 11/2018 |
| EP | 3051758 A1 | 8/2016 |

(Continued)

OTHER PUBLICATIONS

Al-Musawi, "BGP Anomaly Detection Techniques: A Survey", 2017, IEEE, vol. 19, pp. 377-393 (Year: 2017).*

(Continued)

*Primary Examiner* — Piotr Poltorak
*Assistant Examiner* — Gregory A Lane
(74) *Attorney, Agent, or Firm* — Shumaker & Sieffert, P.A.

(57) ABSTRACT

In general, techniques are described for distributed route and packet flow evaluation within a cloud exchange fabric. In some examples, a routing engine is operative to: establish sessions between a first network and a second network to exchange message data identifying destinations in the second network; and verify routing information comprising routes from endpoints in the first network to the destinations based upon the message data, including, for each route of the routes: evaluating a source or a destination for indicia of illegitimate origination, and in response to detecting an illegitimate endpoint at the at least one of a source or a destination based upon identifying one or more of the indicia of illegitimate origination, dropping a corresponding route from the routing information.

20 Claims, 6 Drawing Sheets

(56) References Cited

U.S. PATENT DOCUMENTS

| | | | |
|---|---|---|---|
| 10,735,263 B1* | 8/2020 | McAlary | H04L 41/5054 |
| 11,477,119 B1* | 10/2022 | Shaw | H04L 45/12 |
| 2004/0039839 A1 | 2/2004 | Kalyanaraman et al. | |
| 2006/0272018 A1 | 11/2006 | Fouant | |
| 2007/0153763 A1 | 7/2007 | Rampolla et al. | |
| 2007/0206605 A1 | 9/2007 | Ansari et al. | |
| 2010/0153537 A1 | 6/2010 | Wang et al. | |
| 2011/0134826 A1 | 6/2011 | Yang et al. | |
| 2015/0195291 A1* | 7/2015 | Zuk | H04L 63/168 726/23 |
| 2015/0207729 A1 | 7/2015 | Gagliano et al. | |
| 2015/0341310 A1 | 11/2015 | You et al. | |
| 2016/0226711 A1 | 8/2016 | Liljenstolpe et al. | |
| 2016/0359699 A1 | 12/2016 | Gandham et al. | |
| 2016/0359706 A1 | 12/2016 | Maddux et al. | |
| 2017/0026288 A1 | 1/2017 | Yang et al. | |
| 2017/0041332 A1 | 2/2017 | Mahjoub et al. | |
| 2017/0142096 A1* | 5/2017 | Reddy | H04L 12/1827 |
| 2017/0324738 A1 | 11/2017 | Hari et al. | |
| 2020/0007548 A1 | 1/2020 | Sanghavi et al. | |
| 2021/0037052 A1* | 2/2021 | Camp | G06N 7/005 |
| 2021/0067544 A1* | 3/2021 | Taylor | G06Q 30/0241 |
| 2021/0306256 A1* | 9/2021 | Ward | H04L 45/04 |
| 2021/0385149 A1* | 12/2021 | Suryanarayana | H04L 45/586 |

FOREIGN PATENT DOCUMENTS

| | | |
|---|---|---|
| JP | 4413833 B2 | 2/2010 |
| JP | 2011216978 A | 10/2011 |
| WO | 2017147166 A1 | 8/2017 |

OTHER PUBLICATIONS

U.S. Appl. No. 16/228,540, filed Dec. 20, 2018, naming inventors Li et al.

Fox-Brewster, "A $152,000 Cryptocurrency Theft Just Exploited a Huge 'Blind Spot' in Internet Security," forbes.com, Apr. 24, 2018, 3 pp.

"Arin's Internet Routing Registry (IRR)," retrieved from https://www.arin.net/resources/manage/irr/ on Jul. 26, 2018, 3 pp.

De La Rocha et al., "Blockchain-based Public Key Infrastructure for Inter-Domain Secure Routing," International Workshop on Open Problems in Network Security (iNetSec), May 2017, pp. 20-38.

Paillisse et al., "An Analysis of the Applicability of Blockchain to Secure IP Addresses Allocation, Delegation, and Bindings," Network Working Group Internet Draft, draft-paillisse-sidrops-blockchain-01.txt, Oct. 29, 2017, 23 pp.

Rekhter et al., "A Border Gateway Protocol 4 (BGP-4)," RFC 4271, Network Working Group, Jan. 2006, 104 pp.

U.S. Appl. No. 17/019,001, filed Sep. 11, 2020, naming inventors Kempf et al.

* cited by examiner

ROUTE AND PACKET FLOW EVALUATION ON A CLOUD EXCHANGE

TECHNICAL FIELD

The disclosure relates to computer networks and, more specifically, to evaluating routes and packet flows.

BACKGROUND

Routing protocols, such as Border Gateway Protocol (BGP), enable routing devices to exchange routing information. For example, border routers of an autonomous system (AS) can share routing information with routers in other autonomous systems via exterior BGP route advertisements. The AS is an administrative domain consisting of a connected group of routers having Internet Protocol (IP) addresses under at least one network address prefix (e.g., at least one IP prefix). An autonomous system is owned by a network operator, such as a network service provider. Internet Service Providers (ISPs) often use BGP to establish peering relationships among different ISPs' routers and advertise and/or exchange reachable routes through the autonomous system. As a result, the routers learn the best way to route traffic and reach final destinations. BGP may also be used between Cloud Service Providers (CSPs) and enterprise networks to establish peering sessions for enterprises to consume CSP services, often via at least one ISP network.

Upon establishing BGP peering sessions, peer routers exchange routes via the BGP peering sessions. The routers store the routes in a database called a Routing Information Base (RIB) or routing table. Each route may include at least one destination IP address, which may be expressed in terms of an IP prefix. The prefix refers to a set of IP addresses/ranges denoted by a prefix portion of an IP address that covers the set of IP addresses. In some examples, a route may include a prefix length or subnet mask, and may include a set of information indicating policies and preferences to reach the destination indicated by the prefix.

An ISP typically owns (e.g., leases or is otherwise allocated) a collection of IP prefixes. Internet Routing Registries contain information about autonomous system identifiers (e.g., autonomous numbers (ASNs)) and corresponding IP prefixes owned by the corresponding autonomous system. The Internet Routing Registries may be managed by ISPs or other entities. The ASN is uniquely allocated to identify each autonomous system and must be officially registered for use in BGP routing. Internet Routing Registries can also be used by ISPs to develop routing plans. For example, by setting BGP policies via route filtering (e.g., using Network Layer Reachability Information, AS Path, and Community attributes), ISPs can permit or deny traffic in their networks based on Internet routing registry information.

SUMMARY

The present disclosure describes techniques for distributed route and packet flow evaluation within a cloud exchange fabric. Cloud exchange customers exchange packets in packet flows via interconnections established across the cloud exchange fabric. In order to exchange packets, routers exchange routes defined by an underlying networking protocol, such as Border Gateway Protocol (BGP) routes that specify autonomous system (AS) paths. As described herein, a distributed routing engine facilitates auditing of traffic and routes being exchanged within and across the cloud exchange fabric. The route authentication mechanism may be implemented as a routing engine as part of control plane functionality, which may be embodied in hardware, software, or a combination of hardware and software. In some examples, one or more VNFs may operate as the routing engine for a network service that handles routing and forwarding packets within the cloud exchanges.

In some examples, the routing engine provides route authentication during route exchange and determines whether an advertised route is a legitimate route. When a route is being advertised by an external BGP peer, before the route is installed, the routing engine analyzes the route's origination information, based on the AS path, to determine whether the route origin is legitimate. In other examples, the routing engine provides route authentication during (outgoing) packet transmissions. Once traffic starts flowing, the routing engine performs an audit on a sample of total network traffic from a tenant, tracking origin information for legitimate packets. This may enable the routing engine to distinguish illegitimate endpoints from legitimate endpoints. When a packet is to be sent across the cloud exchange fabric from a cloud exchange customer to an external network or to another customer, the routing engine examines that packet to verify the new route as having a legitimate endpoint as a source. When a new route is exchanged, that route's origin information is compared with the origin information associated with the legitimate endpoints to determine whether the route is legitimate.

The described techniques may provide one or more technical advantages that present at least one practical application. As one advantage, malicious traffic attempts are killed near source of origination without introducing latency. Tenant service level agreements (SLAs) for flow security may in some cases as a result of these techniques extend to route advertisements and outgoing packets. Other data centers employing NFVi technologies do not prevent illegitimate routes from being exchanged. In contrast to firewalls, which are not situated in the middle of a connection but rather at the customer edges and evaluating incoming data traffic and are incapable to evaluate a route or a source, the distributed routing engine described herein can process and evaluate bidirectional traffic at any point within the cloud exchange. As another advantage, by sharing blacklists of identified illegitimate routes and illegitimate endpoints, attacks and infiltrations across the cloud exchange fabric can be mitigated and/or prevented proactively.

In one example, a computing system for one or more cloud exchanges is described. The computing system comprises processing circuitry coupled to a memory; and a routing engine stored in the memory and configured for execution by the processing circuitry, wherein the routing engine is operative to: establish sessions between a first network and a second network interconnected over the one or more cloud exchanges to exchange routing information identifying endpoints in the second network; and verify routing information comprising routes from endpoints in the first network to the endpoints in the second network, including, for each route of the routes: evaluating origin information for at least one of a source or a destination in the second network for indicia of illegitimate origination, and in response to detecting an illegitimate endpoint at the at least one of a source or a destination based upon identifying one or more of the indicia of illegitimate origination, dropping the corresponding route from the routing information.

In one example, a method of a computing system operated by a data center provider for a data center is described. The method comprises establishing, by a routing engine of the computing system, sessions between a first network and a second network interconnected over the one or more cloud exchanges to exchange routing information identifying endpoints in the second network; and verifying, by the routing engine of the computing system, the routing information comprising routes from endpoints in the first network to the endpoints in the second network, including, for each route of the routes: evaluating origin information for the endpoints in the second network for indicia of illegitimate origination, and in response to detecting an illegitimate endpoint at the at least one of a source or a destination based upon identifying one or more of the indicia of illegitimate origination, dropping the corresponding route from the routing information.

In one example, an interconnection system, operated by a data center provider for a data center is described. The method comprises the at least cloud exchange including one or more routing engine configured to: establish sessions between the source and the destination to exchange message data identifying computing systems in the destination; and verify routing information comprising routes from endpoints in the source to the computing systems based upon the message data, including, for each route of the routes: evaluating origin information for at least one of a source or a destination for indicia of illegitimate origination, and in response to detecting an illegitimate endpoint at the at least one of a source or a destination based upon identifying one or more of the indicia of illegitimate origination, dropping the corresponding route from the routing information.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

In general, this disclosure describes techniques in which cloud exchanges provide interconnections with enhanced routing functionality and security. These network services enable virtual networks—including routing engines in these networks—with real-time route authentication, especially for outgoing packet transmissions. There are number of unaddressed vulnerabilities in different security systems; for example, firewalls and other security components fail to detect and/or mitigate security breaches through route advertisements (e.g., from external networks) and/or internal traffic origination. Often overlooked by different security systems, outgoing packets were more likely to succumb to misappropriation by fraudsters.

In some examples, a customer network may learn illegitimate fraudulent routes from routes advertised during networking protocols sessions with other networks and without verifying these routes, may direct outgoing packets to computing systems hosted by fraudsters. To secure outgoing packet transmissions, one example technique described herein may include configuring a routing engine to identify such computing systems as illegitimate endpoints and classify any routes to these systems as illegitimate routes for outgoing packets. An illegitimate endpoint may be a source of an illegitimate route advertisement and/or a destination in an external network for outgoing packets directed on an illegitimate route. Preventing such routes from being used for subsequent transmissions or from being installed in a first place allows the routing engine to secure the network's outgoing packet transmissions.

One example technique may include configuring a routing engine to verify an advertised route even if a trusted edge router in another network advertised the route as a communication path to a neighboring computing system; as one reason, security systems at the customer network edges may not properly identify the neighboring computing system as illegitimate endpoints. Some techniques authenticate a route's origin (e.g., a source of a route advertisement), which may be facilitated by sharing a blacklist or a whitelist of known illegitimate and legitimate endpoints, respectively, while other techniques authenticate an outgoing packet's route based upon previous transmissions on that route and/or that route's reputation, which may be learned from flow statistics, historical/sampled data, and/or the like. In addition to the above, the present disclosure describes a number of benefits and advantages to implementing the techniques described herein. For at least these reasons, the routing engine of the described techniques constitute a technological improvement or a practical application of a solution to a technical problem.

Figure 1:
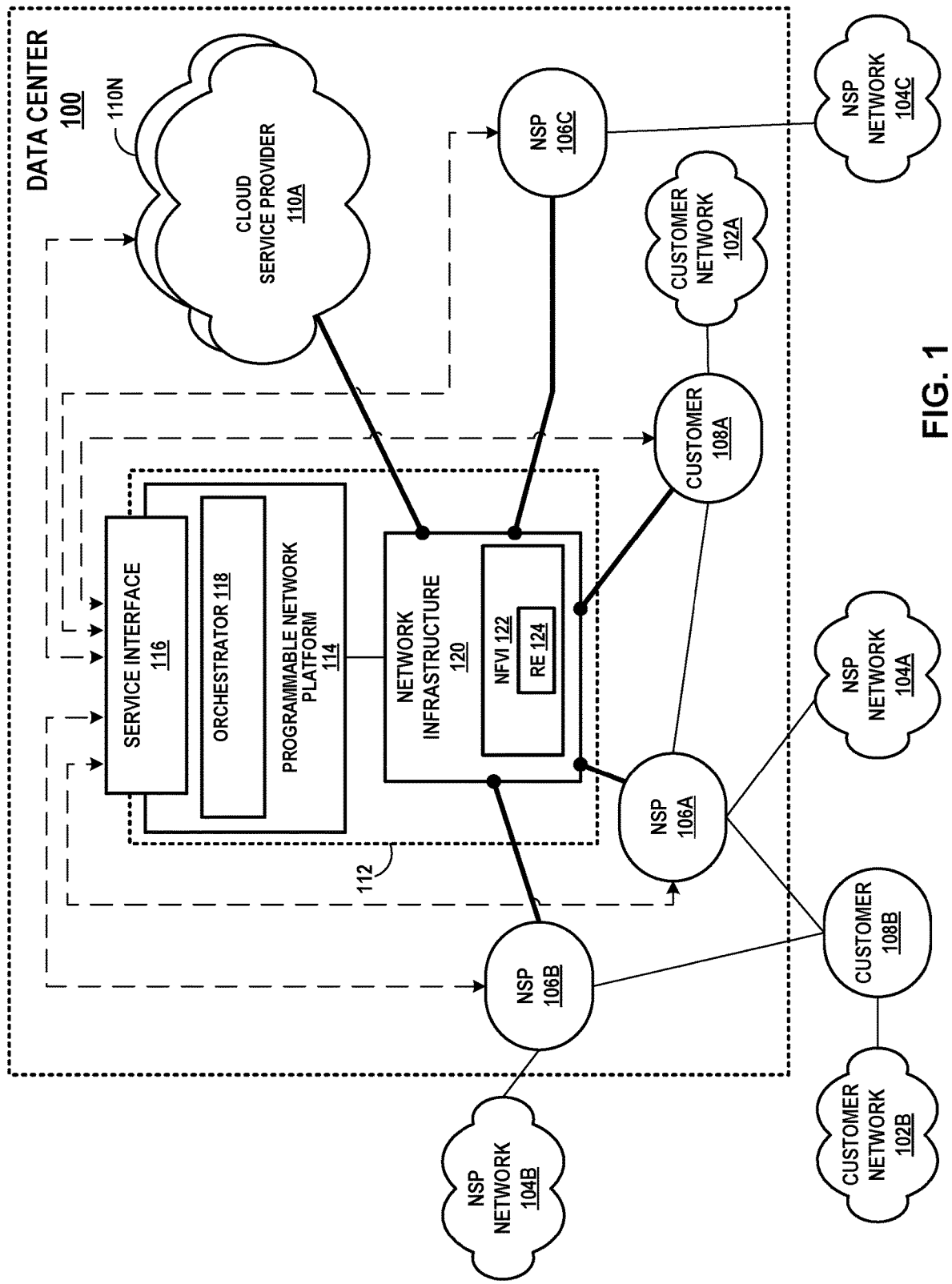
FIG. 1 is a block diagram that illustrates a conceptual view of an example network system having an example exchange in an example data center that provides intelligent route verification for outgoing packets, in accordance with techniques described herein.

FIG. 1 is a block diagram that illustrates a conceptual view of an example network system having an example exchange in an example data center that provides intelligent route verification for outgoing packets, in accordance with techniques described herein. The example data center, such as data center 100, may provide an operating environment for one or more routing engines to perform intelligent route verification.

Data center 100 may be entirely located within a centralized area, such as a warehouse or localized data center complex, and provide power, cabling, security, and other services to various tenants, such as network service providers (NSPs), customers, and cloud service providers (CSPs), that locate (e.g., for colocation) their respective networks within the data center 100 (as internal networks) and/or connect to the data center 100 by one or more external links (as external networks). Some external networks connected to data center are not also data center tenants including certain public and/or private networks (e.g., non-tenant NSPs and CSPs).

Exchange 112 may be a metro-based cloud exchange that provides multiple exchange points (e.g., cloud exchange points). In this example, exchange 112 includes network function virtualization infrastructure (NFVi). Exchange 112 may include one or more cloud-based services exchange points (described hereinafter as "exchange points" and collectively referred to as "exchange points") of which at least two exchange points may represent different data centers (or interconnection facilities) geographically located within the same metropolitan area ("metro-based," e.g., in New York City, New York; Silicon Valley, California; Seattle-Tacoma, Washington; Minneapolis-St. Paul, Minnesota; London, UK; etc.) to provide resilient and independent cloud-based services exchange by which cloud-based services customers and cloud-based service providers connect to receive and provide, respectively, cloud services. In various examples, exchange 112 may include more or fewer exchange points. In some instances, exchange 112 includes just one exchange point. As used herein, reference to an "exchange point" or "cloud-based services exchange point" may refer to an exchange point. A cloud exchange provider may deploy instances of exchanges 112 in multiple different metropolitan areas, each instance of exchange 112 having one or more cloud exchange points.

Exchange 112 provides customers, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in exchange 112 by which a customer may connect to the one or more cloud services offered by the CSPs, respectively. Exchange 112 allows private networks of any customer to be directly cross-connected to any other customer at a common point, thereby allowing direct exchange of network traffic between the networks of the customers.

Further details regarding example data center 100 of FIG. 1 may be found in U.S. Provisional Patent Application Ser. No. 62/908,976 entitled "VIRTUALIZED NETWORK FUNCTIONS VERIFICATION USING DECENTRALIZED IDENTIFIERS," filed on Oct. 1, 2009, which is hereby incorporated by reference herein in its entirety. Further details regarding route advertisements may be found in U.S. patent application Ser. No. 16/228,540, filed Dec. 20, 2018, which is incorporated by reference in its entirety.

Further example details of a cloud-based services exchange can be found in U.S. patent application Ser. No. 15/099,407, filed Apr. 14, 2006 and entitled "CLOUD-BASED SERVICES EXCHANGE;" U.S. patent application Ser. No. 14/927,451, filed Oct. 29, 2005 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,106, filed Oct. 29, 2005 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

In example data center 100 illustrated in FIG. 1, exchange 112 may provide an operating environment that allows a corresponding one of customer networks 102A and 102B of any network service providers (NSPs) or "carriers" 104A-104B (collectively, "'NSP or 'carrier' networks 104") to have a corresponding customer (device) 108A or 108B to be directly connected, via a virtual layer 2 (L2) or layer 3 (L3) connection to any other customer network 102 and/or to any of Cloud Service Provider (CSPs) 110A-N (collectively, "CSPs 110"), thereby allowing direct exchange of network traffic among the customer networks and CSPs 110. The virtual L2 or L3 connection may be referred to as a "virtual circuit."

In some examples, exchange 112 includes one or more exchange points that may be used to implement, at least in part, NFVi 122. Each of the exchange points includes network infrastructure 120 and an operating environment by which customers 108A-108C (collectively, "customers 108") receive cloud services from multiple CSPs 110. Each cloud service provider 110 may host one of more cloud services. As noted above, the CSPs 110 may be public or private cloud service providers.

Carriers or NSPs 106 may each represent a network service provider that is associated with a transit network by which network subscribers of NSPs 106 may access cloud services offered by CSPs 110 via the exchange 112. In general, customers 108 of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the exchange 112.

One example application of exchange 112 is a co-location and interconnection data center 100 in which CSPs 110 and carriers 106 and/or customers 108 may already have network presence, such as by having one or more accessible ports available for interconnection within the data center 100, which may represent any of the above-mentioned exchange points. This allows the participating carriers 106, customers 108, and CSPs 110 to have a wide range of interconnectivity options within the same facility. A carrier/customer may in this way have options to create many-to-many interconnections with only a one-time hook up to one or more exchange points. In other words, instead of having to establish separate connections across transit networks to access different cloud service providers or different cloud services of one or more cloud service providers, exchange 112 allows customers 108 to interconnect to multiple CSPs 110 and cloud services. In this manner, exchange 112 streamlines and simplifies the process of partnering CSPs 110 and customers 108 (via carriers 106 or directly) in a transparent and neutral manner.

Exchange 112 includes programmable network platform 114 for dynamically programming exchange 112 to responsively and assuredly fulfill service requests that encapsulate business requirements for services provided by exchange 112 and/or cloud service providers 110 coupled to the exchange 112. In some examples, programmable network platform 114 enables CSPs 110 to configure exchange 112 with a L3 instance requested by a customer 108. An example customer 108 may request an L3 instance to link multiple cloud service providers by the L3 instance, for example (e.g., for transferring the customer's data between two cloud service providers, or for obtaining a mesh of services from multiple cloud service providers). As described herein, exchange 112 may receive route advertisements directed to the L3 instance and apply some techniques described herein; in some examples, the route advertisements are examined for indicia of illegitimate origination.

In the illustrated example, programmable network platform 114 includes a service interface (or "service API") 116 that defines the methods, fields, and/or other software primitives by which applications, such as a customer portal, may invoke programmable network platform 114. The service interface 116 may allow NSPs 106, customers 108, and/or cloud service providers 110 programmable access to capabilities and assets of exchange 112 according to techniques described herein. For example, the service interface 116 may facilitate machine-to-machine communication to enable dynamic provisioning of virtual circuits in the cloud exchange for interconnecting customer and/or cloud service provider networks. In this way, the programmable network platform 114 enables the automation of aspects of cloud services provisioning. For example, the service interface 116 may provide an automated and seamless way for customers to establish, de-install and manage interconnections among multiple, different cloud providers participating in the cloud exchange.

Programmable network platform 114 may further include network service orchestrator 118 that handles tenant (e.g., cloud client or customer) requests for deployment of VNFs. For example, network service orchestrator 118 may organize, direct and integrate underlying services through virtual machines (or containers), as well as other software and network sub-systems, for managing various services. The programmable network platform 114 may, as a result, orchestrate a business-level service across heterogeneous cloud service providers 110 according to well-defined service policies, quality of service policies, service level agreements, and costs, and further according to a service topology for the business-level service.

Exchange 112 includes network infrastructure 120 (e.g., for a virtual network) and an operating environment by which customer networks 102 may receive services from one or more CSPs 110 via interconnections. In the example of FIG. 1, network infrastructure 120 represents the switching fabric of an interconnection facility of a cloud exchange and includes multiple ports that may be dynamically interconnected with virtual circuits by, e.g., invoking service interface 116 of the programmable network platform 104. Each of the ports is associated with NSPs 106, customers 108, and CSPs 110. This enables an NSP customer to have options to create many-to-many interconnections with only a one-time hook up to the switching network and underlying network infrastructure 120 that presents an interconnection platform for exchange 112. In other words, instead of having to establish separate connections across transit networks to access different CSPs 110, exchange 112 allows a customer to interconnect to multiple CSPs 110 using network infrastructure 120 within data center 100.

NFVi 122 includes one or more servers for executing/hosting virtual network functions (VNFs) that apply network services to packet flows. The programmable network platform 114 enables the cloud service providers 110 that administer exchange 112 to facilitate virtual connections for cloud-based services delivery from multiple cloud service providers 110 to one or more customers 108. Exchange 112 may enable customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Hardware and/or software components for NFVi 122 implement network management and a plurality of VNFs of which at least one, in general, performs at least one technique described herein. In one example, the network management and orchestration systems form an architecture having at least three functional blocks of which one example functional block, an orchestration system, is responsible for onboarding of new network services (NS) and virtual network function (VNF) packages; NS lifecycle management; global and local resource management; and validation and authorization of network functions virtualization infrastructure (NFVi) resource requests. Other functional blocks (e.g., management blocks) oversee lifecycle management of VNF instances; fill the coordination and adaptation role for configuration and event reporting between NFV infrastructure (NFVi) and Element/Network Management Systems, and control and manage the NFVi compute, storage, and network resources. While shown separately as part of programmable network platform 114, these management blocks may reside in NFVi 122 and cooperate with the orchestration system when deploying VNFs.

Customer 108B represents (or includes) a tenant external network for exchange 112. Customer 108B exchanges packetized data in packet flows with one or more other networks (e.g., customer networks, NSP networks, or Cloud-based service provider (CSP) networks), e.g., via virtual circuits or other interconnections through exchange 112. In some cases, NFVi 122 applies one or more network services to the packet flows on behalf of a tenant associated with customer 108B. In the illustrated example, customer 108B exchanges packets for a packet flow with cloud service provider network 110A and for a packet flow with cloud service provider network 110N. As described herein, NFVi 122 providers an operating environment for a routing engine 124 ("RE 124") as an example routing engine providing route and packet flow evaluation for routes advertised and packet flows between any pair of CSP networks 110, NSPs 106, and customer networks 108. While primarily described as being implemented using VNFs, routing engines described herein may be implemented using dedicated appliances or using real or virtual servers.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 120, and a cloud exchange in which customer routers peer with network infrastructure 120 (or "provider") network devices rather than directly with other customers. Exchange 112 may provide, to customers for customer networks 108, interconnection services to cloud services provided by CSPs 110.

For interconnections at layer 3 or above, customers 108 may receive services directly via a layer 3 peering and physical connection to one of colocation facility exchange points or indirectly via one of NSPs 106. NSPs 106 provide "transit" by maintaining a physical presence within data center 100 and aggregating layer 3 access from one or more customers 108. NSPs 106 may peer, at layer 3, directly with data center 100 and in so doing offer indirect layer 3 connectivity and peering to one or more customer networks 102 by which customers 108 may obtain services from exchange 112.

Network infrastructure 120 may be assigned a different autonomous system number (ASN). Network infrastructure 120 in such cases may be a next hop in a path vector routing protocol (e.g., BGP) path from CSPs 110 to customers 108 and/or NSPs 106. As a result, exchange 112 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 110 to customers 108. In other words, exchange 112 may internalize the eBGP peering relationships that CSPs 110 and customers 108 would maintain on a pair-wise basis. Instead, a customer 108 may configure a single eBGP peering relationship with exchange 112 and receive, via the cloud exchange, multiple services from one or more CSPs 110. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As an example, customer network 108A in FIG. 1 is illustrated as having contracted with one of CSPs 110 for exchange 112 to directly access layer 3 services via exchange 112 and also to have contracted with NSP 106A to access layer 3 services via a transit network of NSP 106A. Customer network 102B is illustrated as having contracted with NSPs 106A and 106B to access layer 3 services via transit networks of NSPs 106A and 106B. The contracts described above may be instantiated in network infrastructure 120 of the exchange 112 by L3 peering configurations within switching devices of NSPs 106 and exchange 112 and L3 connections, e.g., layer 3 virtual circuits, established within exchange 112 to interconnect CSPs 110 to NSPs 106 and customer networks 102, all having at least one port offering connectivity within exchange 112.

In some examples, network infrastructure 120 includes one or more virtual machines or containers of NFVi 122 that is used to deploy Virtualized Network Functions (VNFs). In these examples, network service orchestrator 118 may receive a request via service interface 116 to deploy one or more virtualized network functions (e.g., routing engine with real-time route authentication, load balancer, and/or the like) that are implemented in NFVi 122 of network infrastructure 120. Network service orchestrator 118 may request a VNF distribution including VNF images from a VNF provider. One or more VNF images define a routing engine that performs real-time route authentication for a virtual route.

Customers 108 may receive cloud-based services directly via a layer 3 peering and physical connection to one of cloud exchange points or indirectly via one of network service providers 106A-106B (collectively, "NSPs 106," or alternatively, "carriers 106"). Cloud customers 108 may include customers associated with a network service running RE 124 as a routing engine. For example, customers 108 may include systems used by any or all of customer devices used by cloud client to access cloud services via RE 124 executing in NFVi 122 of exchange points. NSPs 106 provide "cloud transit" by maintaining a physical presence within one or more exchange points and aggregating layer 3 access from one or customers 108. NSPs 106 may peer, at layer 3, directly with one or more cloud exchange points and in so doing offer indirect layer 3 connectivity and peering to one or more customers 108 by which customers 108 may obtain cloud services from exchange 112.

As examples of the above, customer 108A is illustrated as having contracted with a cloud exchange provider for exchange 112 to directly access layer 3 cloud services via cloud exchange points. In this way, customer 108A receives redundant layer 3 connectivity to cloud service provider 110A, for instance. Customer 108B, in contrast, is illustrated as having contracted with the cloud exchange provider for exchange 112 to directly access layer 3 cloud services via the same exchange point and also to have contracted with NSP 106B to access layer 3 cloud services via a transit network of the NSP 106B. Customer 108B is illustrated as having contracted with multiple NSPs 106A, 106B to have redundant cloud access to cloud exchange points via respective transit networks of the NSPs 106A, 106B. The contracts described above are instantiated in network infrastructure of exchange points by L3 peering configurations within switching devices of NSPs 106 and exchange points and L3 connections, e.g., layer 3 virtual circuits, established within exchange points to interconnect cloud service provider 110 networks to NSPs 106 networks and customer 108 networks, all having at least one port offering connectivity within exchange 112.

RE 124, in general, implements a real-time route authentication mechanism to verify routes for outgoing packets from an internal network where the routes are advertised by an external network. That is, in contrast to a firewall that operates to identify malicious traffic originating from outside of a network protected by the firewall, RE 124 may verify routes originating from outside of an internal network in order to prevent outgoing traffic from the internal network from being forwarded according to invalid routes. RE 124 protects against propagating false routes within the internal network. With respect to layer 3 peering, RE 124 may examine one or more hops in each route for illegitimate networks (e.g., autonomous systems) or endpoints. In data center 100, RE 124 may reside near A-side (e.g., customer 108A) or Z-side (e.g., CSP 110A or NSP 104B) of an interconnection and continue operating as an intermediary for packet communications between A-side and Z-side. In other examples, RE 124 receives a packet from an internal (physically attached) device and if the intended destination for that packet is determined to be an illegitimate endpoint, RE 124 halts pending outgoing transmission of that frame in the form of packetized data.

Techniques as described herein may leverage RE 124 to enable real-time route authentication for at least one of the above-mentioned interconnected peers (e.g., interconnected customers, interconnected providers, or interconnected provider and customer). When one peer (e.g., customer 108A) is connected via NFVi 122 to another peer (e.g., customer 108B), one example technique configures RE 124 as a routing engine operative to establish sessions (e.g., peering sessions) between a first network (e.g., customer network 102A or NSP network 104C of FIG. 1) and a second network (e.g., customer network 102B, NSP network 104C, or CSP 110A of FIG. 1) to exchange message data (e.g., route advertisements) identifying destinations in the second network. The established sessions initiate route establishment where routes are exchanged between networks. Routing information generated from the message data being exchanged during these sessions may be configured to delineate routes for transmitting packetized data from sources in the first network to the destinations in the second network. To verify any route, RE 124 may evaluate the sources and/or destinations for indicia of illegitimate origination, and in response to detecting an illegitimate endpoint in the second network based upon identifying one or more of the indicia of illegitimate origination, remove a corresponding route from the routing information. The removal causes the identified route to be withdrawn from consideration during routing; as a result, no packet traverses that route to that route's destination. In some examples, RE 124 engages in packet sampling to learn techniques or models for distinguishing legitimate routes from illegitimate ones.

If RE 124 is part of a network service for customer 108A, RE 124 may secure outgoing packets and routes to destinations in CSP 110A and vice versa. If RE 124, on behalf of customer 108A, receives an advertisement for BGP route/AS path from CSP 110A for a neighboring computing system, RE 124 confirms the advertised route's legitimacy before permanent inclusion into a routing information base (RIB). RE 124 may examine the AS path, which identifies autonomous systems that the BGP route passed through to get to a RE 124, providing the necessary origin information to determine whether the BGP route is legitimate. In addition to the autonomous system, RE 124 evaluates, for any indicia of illegitimate origination, the neighboring computing system and purported destination for packet transmissions on the BGP route.

RE 124 provides additional security by protecting internal traffic origination. Instead of rejecting new routes without processing any traffic, RE 124 focuses on processing outgoing packets to determine which routes are legitimate and which are illegitimate.

Figure 2:
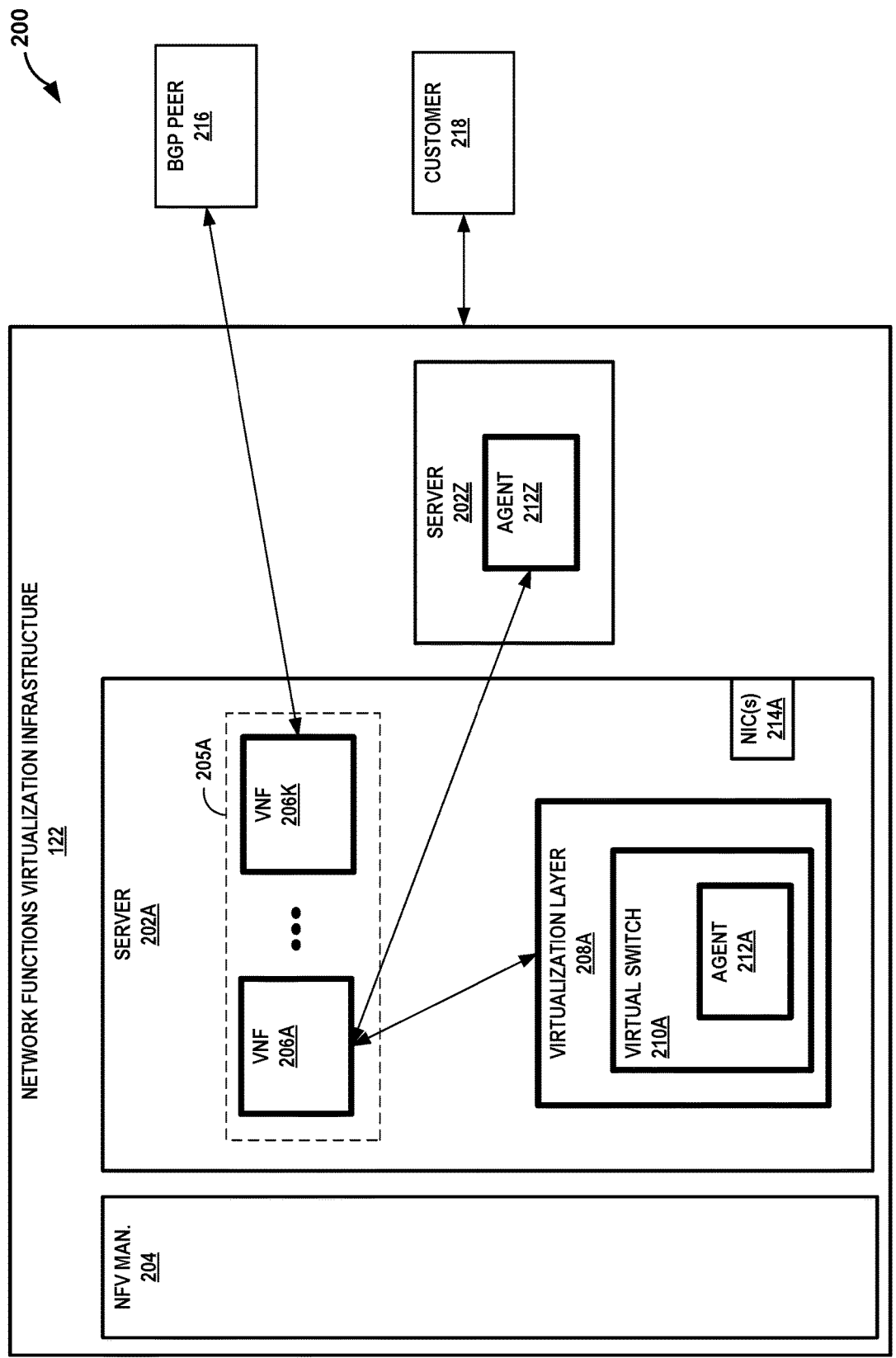
FIG. 2 is a block diagram that illustrates an example Network Function Virtualization Infrastructure having intelligent route verification according to techniques described herein.

FIG. 2 is a block diagram illustrating further details of one example of a computing device that operates in accordance with an example architecture for Network Function Virtualization Infrastructure according to techniques described herein.

In the example of FIG. 2, an exchange point having Network Functions Virtualization infrastructure (NFVi) 122 connects customer devices with other customer devices; in some examples, the exchange point operates as a cloud exchange point connecting the customer devices and cloud service providers running on cloud networks. In some examples, NFVi 122, the customers, and/or the cloud networks may be provided in a data center environment.

NFVi 122 includes one or more servers 202A-202N (collectively "servers 202") for executing/hosting network services including a virtual network device (e.g., a router) connecting customer devices with cloud services. The example architecture of NFVi 122 enables deployment one or more services, such as Virtualized Network Functions (VNFs), on servers 202. NFVi 122 includes computing hardware, storage hardware, and network hardware for executing Virtual Network Functions (VNFs). NFV management 204 handles deployment and organization of these network services, for example, by instantiating VNFs on servers 202 to execute such services. As instructed by an orchestration system, NFV management 204 designates resources (e.g., resource capacities) in servers 202 to support execution of VNFs.

A VNF may provide similar functionality to hardware-based network devices such as dedicated network appliances, but VNFs provide such functionality in software. A VNF is primarily a software construct and thus may be decoupled from the underlying hardware. An example VNF may be stored in storage resources (e.g., memory) and configured for execution by compute resources (e.g., processing circuitry). For example, VNF 206A can provide the same routing, switching firewall, intrusion detection or other services that have traditionally been provided by specialized hardware, but in software. VNF 206A can provide forwarding and network address translation services for network traffic to and from the VNF 206A. In some examples, VNF 206A—in a role as a routing VNF or routing engine to cloud network—performs routing and forwarding operations on packets from customer devices.

Networking equipment (e.g., a gateway) may communicatively couple VNF 206A to a public network, a private network of customer devices, and/or a cloud network. A public network may be a network that is publicly available with few or no restrictions. For example, the public network may be a network that is part of the Internet. A private network may be a network that is part of an enterprise network and only accessible to authorized users. Customer devices are clients of VNF 206A and, as an example, may be computing devices located in a branch office of the tenant or otherwise associated with the tenant or customer. A public gateway may receive traffic having a destination address of the server 202A hosting the VNF 206A within the data center from the public network. VNF 206A may receive network traffic from the gateway.

In the example of FIG. 2, NFVi 122 operates a platform on which servers 202, e.g., server 202A, run virtualization software (e.g., hypervisors) in virtualization layers that enable virtual execution environments on which VNF images (including the network infrastructure software) are deployed. In operation with VNFs 206, virtualization layer 208A may virtualize network infrastructure components (e.g., for data plane and/or control plane functionality) including networking protocols such as those using in routing/switching. Server 202A may provide via virtualization layer 208A one or more virtual machines (VMs) of which each VM emulates hardware for running software. In other words, an example VM (e.g., a LINUX kernel VM (KVM)) provides a virtualized operating system and application suite (e.g., to deploy VNFs) for customer access. Alternatively, or additionally, server 202A may provide containers (e.g., such as those provided by the open source Docker Container application), or other virtual execution environments in which VNFs are implemented. In some examples, NFVi 122 further includes a virtualization layer 208A over the hardware to offer virtual computing, virtual storage, and virtual network for executing VNFs. NFVi 122 may be executed by one or more computing devices in a centralized or distributed manner.

Figure 3:
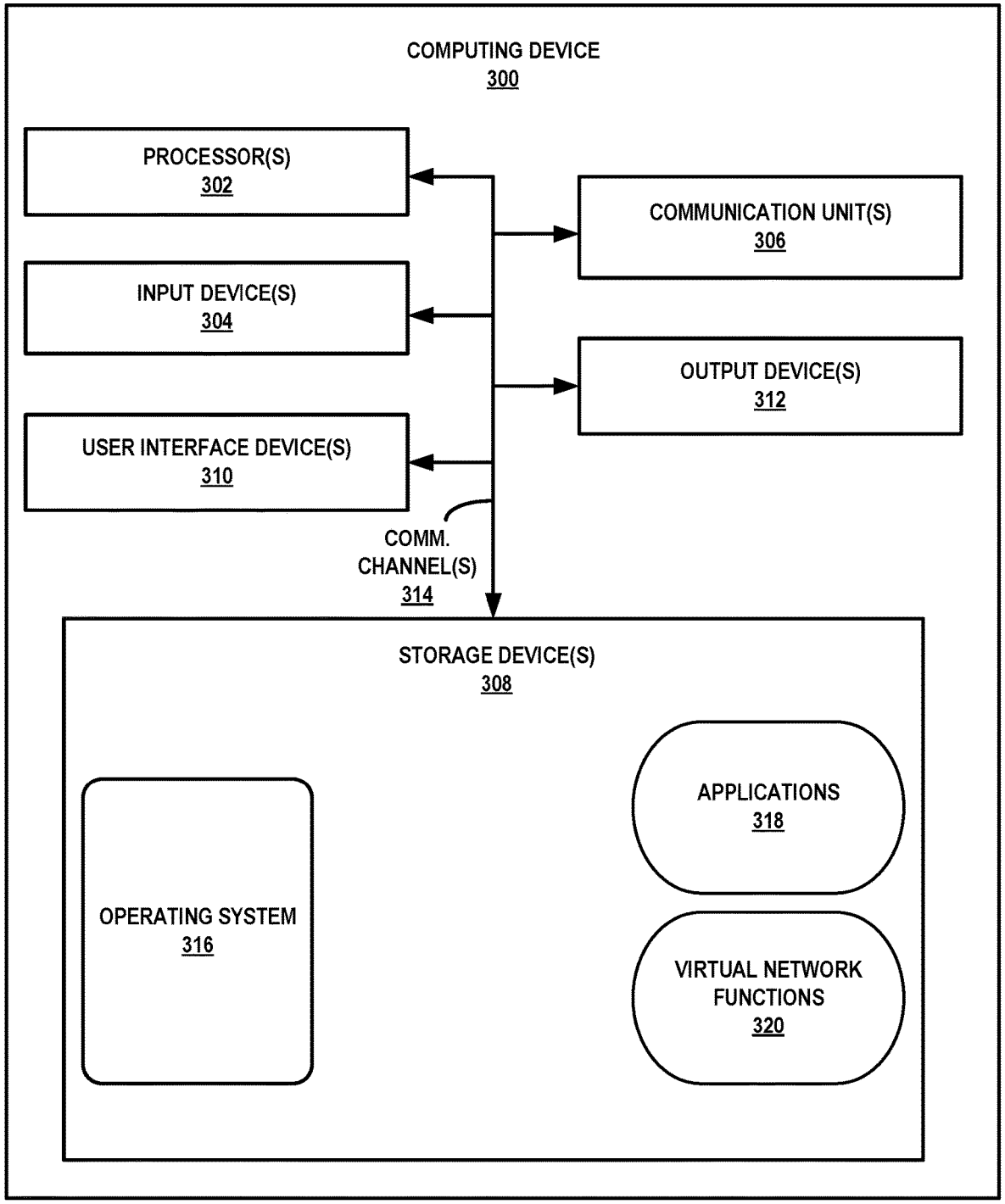
FIG. 3 is a block diagram illustrating further details of one example of a computing device that operates in accordance with one or more techniques of the present disclosure.

In the example of FIG. 3, servers 202 may be at least part of a computer cluster or pod whose physical resources are virtualized into network infrastructure such as NFVi 122. The computer cluster may be labeled a network edge for cloud service providers. Each cloud service provider may be a (separate) data center tenant having one or more VNFs running in servers 202, e.g., server 202A, to provide access to cloud services provided by devices in a cloud network. In some examples, server 202A executes a VNF, e.g., VNF 206A, to perform various services such as routing and forwarding operations for packets directed to that VNF and intended for cloud service providers on the cloud network or received from cloud service providers on the cloud network. However, VNF may apply a network function to flows destined to or sourced by any network (e.g., network service providers and customer networks), the flows being associated with one or more tenants of the data center provider.

When needed, NFV management 204 distributes physical and/or virtual resources to VNFs 206 running in servers 202 of NFVi 122. Examples of the various physical resources include processing resources (e.g., processor cores), networking resources (e.g., physical network interface cards (NICs)), and storage resources (e.g., physical capacities of volatile and non-volatile memory). In one example, using virtualization layer 208A to generate an abstraction of various physical resources, NFV management 204 configures that abstraction into countable virtual resources for use by VNFs 206 running in servers 202 of NFVi 122. Examples of such virtual resources includes compute nodes (e.g., a virtual machine), virtual storage resources, and virtual network resources.

An orchestration system (e.g., network service orchestrator 118) in control of NFVi 122 may use NFV management 204 to allocate physical resources, instantiate virtual machines or containers to operate as servers 202 and then, instruct server 202A to run one or more VNFs 206 (e.g., forming a network service 205A). There are a number of ways for server 202A to implement NFV management 204 instructions, for example, by executing various software programs on computing hardware (e.g., processing circuitry), invoking appropriate operating system programs, and/or calling various functions through an API.

NFV management 204 may virtualize network interface cards (NICs) 214A of server 202 into virtual network resources such as virtual network interfaces (VNIs) and allocate these virtual network interfaces to virtual switch 210A such that each VNI is identifiable in VNI space and configured to direct communications to a device in a specific cloud network, to only a device in a specific customer network, or between these devices (i.e., as an intermediary). The VNI space may refer to a range of virtual network identifiers for corresponding virtual network interfaces (VNIs).

In this manner, virtual switch 210A is configured with logical interfaces where encapsulation and decapsulation for virtual networking in the NFVi 122 occurs. Each of the VNIs may be associated with a virtual network of the NFVi 122 that is assigned to a tenant. That virtual network includes network service 205 comprised of VNFs 206 and, possibly, other servers 202 (e.g., server 202Z). That is, a tenant may be assigned one or more virtual networks for packet flows. Some examples apply intelligent routing techniques to each virtual network individually while other examples combine the virtual networks in terms of flow statistics, routing information, and other data (with an option to weigh one virtual network higher or lower than another). A particular tenant's virtual network may be assigned a corresponding virtual network identifier, such as a VXLAN network identifier. Packet flows that are transported using these virtual networks are associated with the tenant, and packets of such a packet flow may include the virtual network identifier for the virtual network on which the packet flow is transported. Using the virtual network identifier, agent 212A in server 202A may distinguish these packet flows from other flows and identify a fraction for sampling various flow statistics. Tenant-flow statistics generally includes measured or computed packet flow information (e.g., packet size, packets per second, estimated bandwidth, and/or the like) for flows associated with each of one or more tenants of the NFVi 102 provider.

In one example, virtual switch 210A may be configured with VXLAN interfaces, each VXLAN interface being configured with a different VNI and corresponding VNI identifier. When physical network interfaces in server 202A (e.g., NICs 214A) receive network traffic in form of one or more packet flows of which packets include information identifying one or more VNIs. Virtual switch 210A switches each packet flow to their correct VNF which may be the VNF to which the VNIs are assigned. Agent 212A collects a packet flow data, including the VNI per flow, and sends the collected packet flow data to the collector.

Techniques as describes herein enable intelligent route verification for at least one of interconnected peers (e.g., interconnected customers, interconnected providers, or interconnected provider and customer). Some techniques employ one or more VNF(s) 206 and VNF technology in general to embody accurate intelligent route verification in a routing engine (i.e., an intelligent routing engine). In accordance with at least one technique, one or more VNF(s) 206 may be configured to classify any given route as a legitimate route or an illegitimate route and then, add that route to either a blacklist or a whitelist, depending upon the classification. Spreading intelligence, for example, by sharing the blacklist or whitelist, enables other (intelligent) routing engines to immediately detect illegitimate and/or legitimate routes, flagging illegitimate ones for removal from the routing information base (RIB) and installing/permitting traffic on legitimate ones. In any case, there is a substantial reduction in costs with respect to time, capital, and resources The whitelist or blacklist provides the other routing engines with these cost savings from not having to classify routes based upon indicia of illegitimate origination and/or from not having to extract data from sampled outgoing packet transmissions. Hence, implementing these techniques achieves, for the one or more VNF(s) 206, accurate route verification by leveraging various information that has been determined to be useful in route evaluation/classification. Examples of such useful information include hardwired rules and/or attributes extracted from (sampled) outgoing packet transmissions.

As mentioned above, the techniques described herein are applicable to a first and a second network having an interconnection between a first network device and a second network device. When one peer (e.g., customer 108A) is connected via NFVi 122 to another peer (e.g., customer 108B), one example technique configures any VNF, e.g., VNF 206K, as a routing engine operative to establish sessions (e.g., peering sessions) between a first network (e.g., customer network 102A or NSP network 104C of FIG. 1) and a second network (e.g., customer network 102B, NSP network 104C, or CSP 110A of FIG. 1) to exchange message data (e.g., session messages) identifying destinations in the second network. The established sessions initiate route establishment where routes are exchanged between networks. Routing information generated from the message data being exchanged during these sessions may be configured to delineate routes for transmitting packetized data from sources in the first network to the destinations in the second network. To verify any route, VNF 206K may evaluate the sources and/or destinations for indicia of illegitimate origination, and in response to detecting an illegitimate endpoint in the second network based upon identifying one or more of the indicia of illegitimate origination, remove a corresponding route from the routing information. The removal causes the identified route to be dropped or withdrawn from consideration during routing; as a result, no packet traverses that route to that route's destination. classify a route as a legitimate route or an illegitimate route based upon data extracted from outgoing packet transmissions; and add the route to a blacklist or a whitelist One example implementation of indicia of illegitimate origination may be a set of rules configured to verify routes. Some techniques may cause VNF 206K to apply these rules to route data, packet metadata, and/or sampled statistics corresponding to network traffic. Employing various mechanisms, VNF 206K may identify a country of origin for a particular route, and if that country of origin is identified in a rule as being at least suspicious, let alone malicious, VNF 206K may remove the particular and generate output for display on a display device alerting an administrator as to the removal.

To illustrate by way of example, if a cloud customer contracts for interconnection services for an Internet connection and a cloud service (e.g., AWS), the cloud customer may receive a legitimate Internet connection and a legitimate cloud service; however, a fraudster, actively infiltrating the cloud service, may be able to establish a destination in the cloud-service provider network. Once the fraudster is able to establish a network resource purporting to a legitimate endpoint in the ISP or the cloud-service provider network, in order to receive traffic, that destination may use legitimate neighbors to advertise routes to the destination's ports. When a route to the fraudster's illegitimate destination is exchanged via a BGP peering session with server 202A, VNF 206K evaluates route data for origin information having one or more indicia of illegitimate origination. If the route data provides a network address (e.g., an Internet Protocol (IP) address)), VNF 206K may parse the network address into tokens and translate one or more tokens into location data. One token may identify a country of origin, a second token may identify a region in that country, and each succeeding token may provide more granular location information (e.g., a city). If VNF 206K extracts a token encoding a non-US country as a country of origin and the fraudster's illegitimate destination purports to be a secure cloud service that is bound—by law and/or contract—to be located in the United States, VNF 206K identified an indicia of illegitimate origination. Any packet originating from either the fraudster's illegitimate destination or a customer device in the cloud customer's network poses a risk to the both the cloud customer and the cloud service. Because of the severity of the indicia of illegitimate origination, VNF 206K automatically removes the route and flags the route's endpoint as an illegitimate destination.

Statistics and other data points associated with (a sample of) the transmitted packet flows may provide useful information, for example, for intelligent routing techniques as described herein to secure data communications to or from tenants. While a pair of tenants (e.g., a pair of CSP or ISP customers or a customer and that customer's ISP or CSP) exchange data (e.g., in form of protocol data units (PDUs) such as packets, frames, or datagrams, segments, etc.), agent 212A captures at least some of the exchanged data and then, provides the above-mentioned statistics and other data points to an appropriate one of VNFs 206; in turn, that appropriate VNF 206 combines the provided statistics and other data points with statistics and other data points provided by other agents 212, e.g., agent 212Z, in other servers 202, e.g., server 202Z. Agent 212A (e.g., as a background process in server 202A) may record various data points over time as historical data; for example, tenant-related statistics including flow statistics not captured via sampling) may be stored in a database. Similar to the above-mentioned statistics and other data points, agent 212A provides such historical data to the appropriate one of VNFs 206, which makes such historical data available to other agents.

Tenant-related statistics including flow statistics and other data points acquired by way of sampling and historical data include various examples of useful information, for example, for classifying advertised routes as illegitimate and distinguishing legitimate routes from the illegitimate ones. To protect NFVi 122, the data center tenants and the data center itself, one or more VNFs 206 transform the various examples of useful information into indicia of illegitimate origination. Such indicia may be arranged into various forms, including rules, conditions, triggering events, and any other data capable of detecting an illegitimate endpoint in an otherwise legitimate network.

It should be noted that any network including those owned and controlled by data center tenants, may be infiltrated by fraudsters only to be littered with hacked and/or fraudulent computing systems purporting to be legitimate. Any route where one of these computing systems is a destination or an intermediary poses a dangerous risk to data center 100 that could result in terrible consequences: a denial of service, identity theft, monetary loss, and/or the like.

When network service 205 receives message data defining a new or modified route (e.g., to a new destination in an external network), other components (e.g., VNFs 206) react in a number of ways of which some or all are preserved in historical data maintained by agents 212. Such data may be mined for attribute data describing these reactions as well as tenant device behaviors characteristic of a legitimate route. One or more VNFs 206 of network service 205 may extract from the mined attribute data pertinent aspects of each route (e.g., each route's origination information) as indicia of illegitimate origination. To illustrate by way of example, protocols defining device-to-device connections between any two networks may each cause a same sequence of event sequences unique to that particular connection protocol. Based upon an example event sequence for installing File Transfer Protocol (FTP) routes-which is to create control connection first and data connection second-one or more VNFs 206A in network service 205 may create at least one rule to identify routes causing a customer's device in a data center tenant, in control of network service 205, to create only FTP control connections with an endpoint in an external network for such behavior is definitely indicative of an illegitimate, fraudulent, or malicious computing system. One or more VNFs 206A in network service 205 are to review any route corresponding to that same behavior or a similar one; that review may result in the removal of illegitimate routes from routing information base (RIB), preventing installation of that route if new or modified or preventing (e.g., halting) future data communications (e.g., of PDUs). The endpoint and/or the route to the endpoint may also be added to a blacklist while a whilelist stores only legitimate routes and endpoints.

To illustrate by way of another example, protocols managing transportation of data units from a source to a destination (i.e., transport protocols) may each prescribe to a particular calculus for path selection. TCP protocol segments perform worst on congested networks and require dedicated routes. UDP traffic is considered low priority and often takes different/cheaper routes. Any TCP or UDP segment caught traversing a congested route and/or an expensive route is deviating from known established TCP or UDP behaviors for legitimate routes and endpoints. Hence, these established behaviors can be codified into rules for indicia of illegitimate origination and for that reason, the congested route and/or the expensive route may be labelled as being routes having illegitimate origination. Following the congested route and/or an expensive route may lead the TCP or UDP segment to an illegitimate intermediary or illegitimate endpoint in an otherwise legitimate (external) network. In both instances, at least one destination in the that external network is determined to be illegitimate. The intermediary or endpoint and/or any route to the intermediary or endpoint may be added to a blacklist while a whilelist stores only legitimate endpoints or intermediaries and routes.

In some examples, VNF 206A of network service 205 (e.g., a routing engine) generates, as example(s) of indicia of illegitimate origination, a feature set for a machine learning model that is configured to classify certain route advertisements as fraudulent and any route in these fraudulent advertisements as illegitimate. For any given route including new or modified routes, example features of the feature set are configured to measure certain aspects (e.g., parameters) of a route and based upon those measurements (e.g., in comparison with a baseline of feature measurements), VNF 206A (or another VNF 206) of network service 205 may remove that route from the routing information base (RIB). The baseline may be pre-determined or dynamically updated as more tenant and flow-related statistics and historical data is processed into indicia of illegitimate origination. Attributes and metadata for the statistics and historical data provide features while data in the statistics and historical data provide training data for the machine learning model to learn values for these features. With sufficient training data and by completing training operations with such training data, the machine learning model may provide any route under evaluation with an accurate classification regarding legitimacy. Applying the machine learning model to a route ultimately results in a numeral or a probability indicating a quantity, a quality or both and based upon that numeral or probability's relative magnitude, the route may or may not be legitimate as defined herein. For the machine learning model, the feature set enables differentiation between legitimate and illegitimate endpoints/intermediaries of any route including those classified as being legitimate or illegitimate. Using the classify a route as a legitimate route or an illegitimate route based upon various information including data extracted from outgoing packet transmissions; and add the route to a blacklist or a whitelist With respect to securing data communications to/from/between tenants, useful information may be provided through other means (e.g., other sources) than agents 212. Networking protocols including routing protocols engaged in by server 202A as the network edge (e.g., edge network device) may provide useful routing information and/or forwarding information. As an example, VNF 206K may engage in BGP sessions with neighbors, such as BGP peer 216, to obtain information regarding those neighbors and the network or data center in which those neighbors reside. VNF 206K may learn next-hops from BGP peer 216 as well as routes to specific destinations in that network or data center (e.g., specific customer or cloud devices in a customer network or cloud network, respectively) and store the learned next-hops and/or routes in a table (e.g., a routing table). Using these routes, VNF 206K may instruct virtual switch 210A to communicate a tenant's packets to the specific destinations in that network or data center (e.g., specific customer or cloud devices in a customer network or cloud network, respectively). VNF 206K may learn information (e.g., origin information such as country of origin) for at least some of these destinations; at least some of this information may be used for securing the tenant's packets for any packet directed to (or originating from) these destinations may pose a risk to the tenant and the example data center. That tenant's packets may be entering an adversarial computing environment where a fraudster uses the tenant's packet data (e.g., payload data) to commit malfeasance, for example, by misappropriating the tenant's identity and/or resources (e.g., funds) and/or surreptitiously accessing the tenant's devices.

Techniques for intelligent routing as described herein mitigate or eliminate altogether the likelihood of the tenant's packets being misused for nefarious purposes. These techniques leverage at least some of the above-mentioned information to validate routes to external destinations, for example, at the time of route generation, after a suitable amount of time, and/or after sufficient sampling of packet communications. Other useful information may be provided by NFV management 204, the orchestration system, In some examples, VNF 206A (or an external program that feeds data to VNF 206A) leverages SNMP to communicate with Agent 216Z in server 202Z in order to configure sFlow monitoring on that server. Agent 212A uses two forms of sampling mechanisms: statistical packet-based sampling of switched or routed Packet Flows, and time-based sampling of counters. In general, Packet Flow Sampling and Counter Sampling is performed by sFlow Instances associated with individual data sources within Agent 212A. In order to perform Packet Flow Sampling, an sFlow Instance is configured with a Sampling Rate. The Packet Flow sampling process results in the generation of Packet Flow Records. In order to perform Counter Sampling, an sFlow Instance is configured with a Sampling Interval. The Counter Sampling process results in the generation of Counter Records. The Agent 212A collects Counter Records and Packet Flow Records and sends them in the form of sFlow Datagrams to VNF 206A.

Packet Flow Sampling, an example of Packet Flow Monitoring, is accomplished as follows: When a packet arrives on an interface (e.g., VNI with identifier "123"), VNF 206A makes a filtering decision to determines whether the packet should be dropped. If the packet is not filtered, a destination interface is assigned by VNF 206K's switching/routing function. At this point, agent 212A determines whether or not to sample the packet. Agent 212A uses a counter that is decremented with each packet. When the counter reaches zero a sample is taken, whether or not a sample is taken, the counter Total_Packets is incremented and Total Packets is a count of all the packets that could have been sampled. Agent 212A, using Counters such as the counter Total_Packets, generates a variety of information including flow statistics. VNF 206A may use these flow statistics to verify routes and based upon any indicia of illegitimate packet origination, instruct NFVi 122 regarding whether or not to drop a route for being risky or otherwise invalid. In one example, the collected flow statistics may be used to identify external destinations purporting to be legitimate while hosting fraudsters/adversaries.

Taking a sample involves either copying the packet's header or extracting features from the packet and storing the sampled information in a sFlow datagram. Example flow attributes of the sampled information include: a source address SRC, a destination address DEST, a virtual network identifier (e.g., virtual network identifier such as a VXLAN network identifier or one of VNIs), and a packet size.

An sFlow Datagram contains lists of Packet Flow Records and Counter Records. The format of each record is identified by a data_format value. The data_format name space is extensible, allowing for the addition of standard record types as well as vendor-specific extensions. A number of standard record types have been defined. However, an sFlow Agent is not required to support all the different record types, only those applicable to its treatment of the particular packet being reporting on. For example, if VNF 206A implements a layer 2/3 switch, VNF 206A reports to agent 212A layer 2 information for packets it switches, and layer 2 and layer 3 information for packets it routes. The data_format uniquely identifies the format of an opaque structure in the sFlow specification. A data_format is constructed to uniquely identify the format of the structure (e.g., a standard structure). An example data_format could identify a set of flow attributes when used to describe flow_data.

Every time a sample is taken, the counter Total_Samples, is incremented. Total_Samples is a count of the number of samples generated. Samples are sent by the sFlow Instance to Agent 212A for processing. The sample includes the packet information, and the values of the Total_Packets and Total_Samples counters. The agent 212A may then use the samples to obtain additional information about the packet's trajectory through NFVi 102. Such information depends on the forwarding functions of VNF 206K. Examples of trajectory information provided are source and destination interface, source and destination address, source and destination VLAN, next hop, next hop subnet, full AS path. Details of the trajectory information are stored in the sFlow Datagram Format along with any other important information. Virtual switch 210A assumes that the trajectory information applies to each packet. The trajectory information may be used as routing information for verification by VNF 206K.

Virtual Switch 210A refers to a vector packet processing application built on a software platform (e.g., proprietary and open source versions of CISCO® Vector Packet Processing technology). Virtual switch 210A, in general, provides data plane functionality including packet forwarding operations, which may be used by VNF 206K for packet routing operations. Virtual switch 210A includes a set of forwarding nodes arranged in a directed graph and a supporting framework. The framework has all the basic data structures, timers, drivers (and interfaces to driver software development kits (e.g., data plane development kit (DPDK)), a scheduler which allocates the CPU time between the graph nodes, performance and debugging tools, like counters and built-in packet trace. The latter enables capturing the trajectory information or the paths taken by the packets within the graph with high timestamp granularity, giving full insight into the processing on a per-packet level. Virtual switch 210A may process trajectory information such as the trajectory information determined by the framework and any trajectory information generated via flow monitoring. Virtual switch 210A may couple to VNI interfaces and process packets that arrive through physical network hardware on server 202A. Using the trajectory information, virtual switch 210A assembles those packets into a vector, e.g. Virtual switch 210A sorts packets by protocol or format and when software nodes in Virtual switch 210A are scheduled, Virtual switch 210A takes its vector of packets and processes them in a tight dual loop (or quad-loop) with prefetching to the CPU cache to achieve optimal performance.

BGP peer 216 may be a device in a cloud network configured to communicatively couple VNF 206K to one or more cloud services provided by cloud service providers (e.g., CSPs 110 of FIG. 1). The cloud network may be generally hidden from or otherwise unavailable to devices on a public network. For example, cloud network may receive packet flows from the VNF 206K that are communicated to a cloud service from a customer device or another cloud service. Examples of cloud services include Google Cloud, Azure, Oracle Cloud, Amazon Web Services (AWS), IBM Cloud, Alibaba Cloud, and Salesforce. In some aspects, cloud network can be an Equinix Cloud Exchange Fabric provided by Equinix Inc. of Redwood, California. VNF 206K may be a vendor-neutral VNF that combines two or more cloud services into a hybrid cloud service.

As described herein, flow information captured by agent 212A may be mined for flow-related statistics associated with tenants and tenant VNFs including the particular tenant and the particular tenant VNF, VNF 206A. One of the VNFs 206 uses the corresponding flow statistics to compute various statistics and other informational data points. The corresponding flow statistics may indicate values for various variables describing a packet flow including a total number of packets, a total amount in bytes, packets per second, an average packet size or distribution of packet size(s) and/or the like. Tenant and Flow-related statistics and other historical data may be used to characterize behavior(s) of certain protocols (e.g., networking protocols).

VNFs 206 may operate network service 205 to maintain various information of external networks including peer devices such as BGP peer 216. VNFs 206 may operate network service 205 to handle outgoing packet transmissions from and incoming packet transmissions to customer 218, and one or more of VNFs 206 may operate as a routing engine to perform real-time route authentication. In some examples, VNF 206A mines sampled packet data for indicia of illegitimate route origination to arrange into rules for route authentication. In accordance with various networking protocols, VNFs 206 routes and forwards network traffic to appropriate next hop while VNF 206A generates statistics and other historical information from flow records. Because the network traffic is known or assumed to be legitimate, the generated information includes examples of legitimate route origination. VNF 206A may convert these statistics and other historical information into indicia of illegitimate route origination. TCP protocol data units (e.g., packets or segments) perform worst on congested networks and require dedicated routes. UDP traffic is considered low priority and often takes different/cheaper routes. Any TCP/UDP packet deviating from these behaviors is identified as having illegitimate origination and a source that is an illegitimate endpoint.

When a route is known to be a legitimate, VNF(s) 206 perform an audit on a sample of total network traffic on such a route. In some examples, VNF(s) 206 may perform an audit on the traffic for some period of time and/or for a number of starting packets unless there is a drastic change in traffic flow. VNF(s) 206 may first identify an underlying network protocol and determine new indicia of illegitimate origination for that type of traffic. If traffic is based on FTP, which normally forms control connection and then, a data connection, a rule can be created to identify an endpoint that is only creating FTP control connections. That endpoint may be added to a blacklist.

VNF(s) 206 may employ packet sampling to identify a set of rules based on indicia of illegitimate origination. From a sample of packets, VNF(s) 206 determine whether these packets are coming from a legitimate source. VNF(s) 206 may check route registry corresponding to a source of the packets. VNF(s) 206 may check source BGP routes/AS paths in that route registry. If too many TCP Sync are coming from a single endpoint, VNF(s) 206 will halt forwarding traffic to that endpoint. If an endpoint is creating only embryonic connections, VNF(s) 206 will stop forwarding traffic. If there are retransmissions on network, VNF(s) 206 will halt traffic. If link congestion is detected on a route, VNF(s) 206 will halt won't use the route to send traffic for a set time period. If out of order TCP packets are detected, VNF(s) 206 will halt forwarding traffic.

In some examples, VNF(s) 206 evaluate a BGP route/AS path being advertised to determine whether the route is a legitimate route prior to installing that route. VNF(s) 206 may determine route origin information based on AS path and apply one or more rules. These rules may be predetermined, learned from historical legitimate routes, or both. One rule may identify, as indicia of illegitimate route origination, a route for website.com is being advertised from an endpoint located in an unsafe region. Another rule may identify, as indicia of illegitimate route origination, a website.com route being advertised from an unsafe region and directed to VNF(s) 206. If either rule applies, the route will not be installed.

FIG. 3 is a block diagram illustrating further details of one example of a computing device that operates in accordance with one or more techniques of the present disclosure. FIG. 3 may illustrate a particular example of a server or other computing device 300 that includes one or more processor(s) 302 for executing any one or more of any system, application, or module described herein. For example, the one or more processor(s) 302 may execute instructions of VNF(s) 206 to instantiate and deploy VNFs to NFVi and apply techniques described herein to determine and configure compute resource allocations for VNFs executing on servers of the NFVi. As such, computing device 300 may represent an example instance of server 202A or another system for VNFs executing on servers of the NFVi in accordance with techniques of this disclosure. Other examples of computing device 300 may be used in other instances. Although shown in FIG. 3 as a stand-alone computing device 300 for purposes of example, a computing device may be any component or system that includes one or more processors or other suitable computing environment for executing software instructions and, for example, need not necessarily include one or more elements shown in FIG. 3 (e.g., communication units 306; and in some examples components such as storage device(s) 308 may not be co-located or in the same chassis as other components).

As shown in the specific example of FIG. 3, computing device 300 includes one or more processors 302, one or more input devices 304, one or more communication units 306, one or more output devices 312, one or more storage devices 308, and user interface (UI) device 310, and communication unit 306. Computing device 300, in one example, further includes one or more applications 322, programmable network platform application(s) 324, and operating system 316 that are executable by computing device 300. Each of components 302, 304, 306, 308, 310, and 312 are coupled (physically, communicatively, and/or operatively) for inter-component communications. In some examples, communication channels 314 may include a system bus, a network connection, an inter-process communication data structure, or any other method for communicating data. As one example, components 302, 304, 306, 308, 310, and 312 may be coupled by one or more communication channels 314.

Processors 302, in one example, are configured to implement functionality and/or process instructions for execution within computing device 300. For example, processors 302 may be capable of processing instructions stored in storage device 308. Examples of processors 302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage device 308, in some examples, is described as a computer-readable storage medium. In some examples, storage device 308 is a temporary memory, meaning that a primary purpose of storage device 308 is not long-term storage. Storage device 308, in some examples, is described as a volatile memory, meaning that storage device 308 does not maintain stored contents when the computer is turned off. Examples of volatile memories include random access memories (RAM), dynamic random access memories (DRAM), static random access memories (SRAM), and other forms of volatile memories known in the art. In some examples, storage device 308 is used to store program instructions for execution by processors 302. Storage device 308, in one example, is used by software or applications running on computing device 300 to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication units 306. Computing device 300, in one example, utilizes communication units 306 to communicate with external devices via one or more networks, such as one or more wired/wireless/mobile networks. Communication units 306 may include a network interface card, such as an Ethernet card, an optical transceiver, a radio frequency transceiver, or any other type of device that can send and receive information. In some examples, computing device 300 uses communication unit 306 to communicate with an external device.

Computing device 300, in one example, also includes one or more user interface devices 310. User interface devices 310, in some examples, are configured to receive input from a user through tactile, audio, or video feedback. Examples of user interface devices(s) 310 include a presence-sensitive display, a mouse, a keyboard, a voice responsive system, video camera, microphone or any other type of device for detecting a command from a user. In some examples, a presence-sensitive display includes a touch-sensitive screen.

One or more output devices 312 may also be included in computing device 300. Output device 312, in some examples, is configured to provide output to a user using tactile, audio, or video stimuli. Output device 312, in one example, includes a presence-sensitive display, a sound card, a video graphics adapter card, or any other type of device for converting a signal into an appropriate form understandable to humans or machines. Additional examples of output device 312 include a speaker, a cathode ray tube (CRT) monitor, a liquid crystal display (LCD), or any other type of device that can generate intelligible output to a user.

Computing device 300 may include operating system 316. Operating system 316, in some examples, controls the operation of components of computing device 300. For example, operating system 316, in one example, facilitates the communication of one or more applications 318 with processors 302, communication unit 306, storage device 308, input device 304, user interface devices 310, and output device 312.

Application(s) 318 and Virtual Network Functions (VNFs) 320 may also include program instructions and/or data that are executable by computing device 300. Furthermore, one or more VNFs 320, as an example, may include software to routing engine 124 of FIG. 1 and may operate as illustrated and described herein. As instructed by an orchestration system running in a data center in which computing device 300 resides, a number of VNFs are instantiated and executing at a same time; the one or more VNFs 320 may be configured to provide real-time route authentication and packet flow evaluation. This may be accomplished in part by implementing techniques described herein. As one example, the VNFs 320 may apply control plane and data plane functionality to incoming and outgoing packets and the one or more VNFs 320 may apply techniques described herein to determine whether an advertised route is legitimate.

Figure 4A:
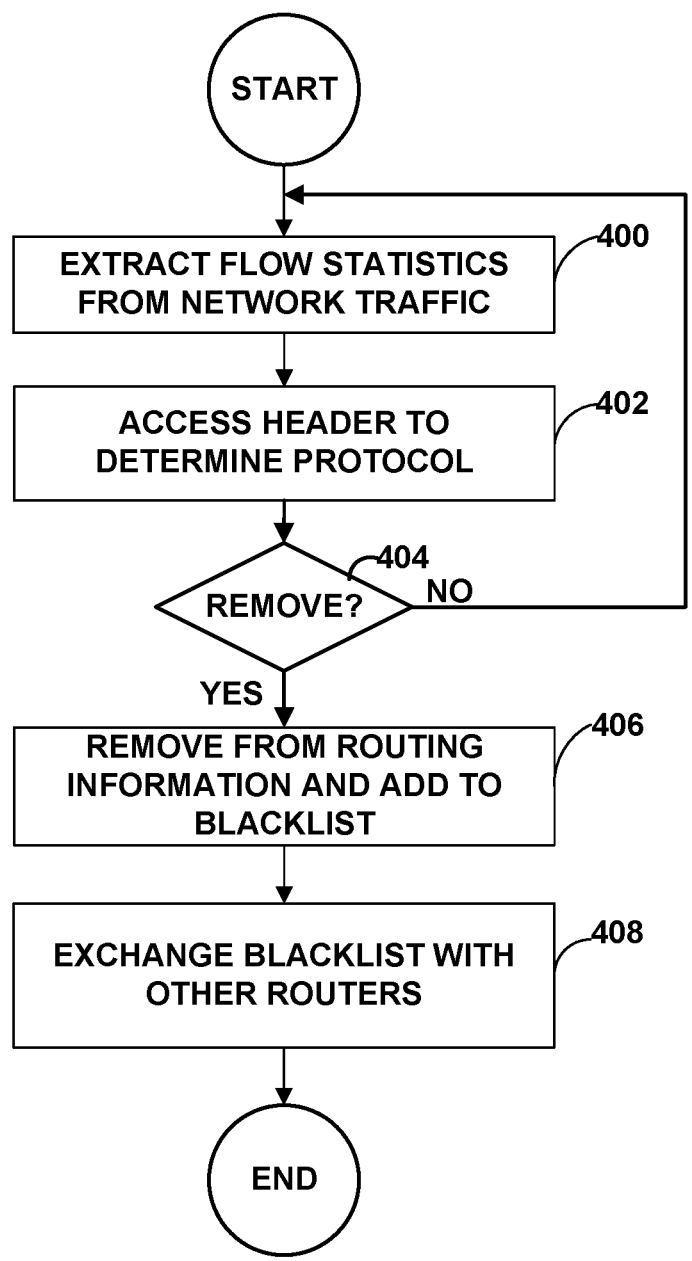
FIG. 4A is a flowchart illustrating example first operations for a routing engine according to techniques described herein.

FIG. 4A is a flowchart illustrating example mode of operations of a routing engine, according to techniques described herein.

The following operations are described with respect to VNF(s) 206 of FIG. 2 operating as an example routing engine component. In some examples, VNF(s) 206 maintain various information (e.g., a map and routing information) of peer devices or simply "peers" (e.g., network devices such as routers having routing engines). VNF(s) 206, in accordance with various networking protocols, routes network traffic to appropriate next hops and during such routing, extract flow statistics from at least a portion of the total network traffic (400).

For each sampled packet, VNF(s) 206 receives the packet and accesses the packet's header to determine the underlying network protocol (402). By doing so, VNF(s) 206 may learn distinguishing characteristics for legitimate operation of certain protocols. For example, TCP protocol data units (e.g., packets or segments) perform worst on congested networks and require dedicated routes. UDP traffic is considered low priority and often takes different/cheaper routes.

Upon receiving a new route advertisement, VNF(s) 206 determine whether to remove the new route from any routing information (404). Based upon one or more indicia of illegitimate origination in the new route (YES BRANCH of 404), VNF(s) 206 may proceed to removing the new route from any routing information and add the new route to a blacklist (406). If the new route is determined to have no or insufficient indicia of illegitimate origination (NO BRANCH of 404), VNF(s) 206 may add the new route to a whilelist and then, return to sampling a next packet. In alternative examples, VNF(s) 206 may examine an existing route for indicia of illegitimate origination at 404 and if that existing route is determined to be from an illegitimate endpoint, VNF(s) 206 may remove the existing route from any routing information and adds the existing route to the blacklist (406).

VNF(s) 206 may employ packet sampling to collect a sufficient number of packets for determining a set of rules based on indicia of illegitimate origination. From a sample of packets, VNF(s) 206 may determine whether these packets have a legitimate source. VNF(s) 206 may check route registry corresponding to sources or destinations of the sampled packets. In some examples, VNF(s) 206 may check source BGP routes/AS paths in that route registry. If the BGP route/AS path corresponds to an illegitimate source, VNF(s) 206 may remove the corresponding route and halt future traffic. As another rule, if too many TCP Sync are coming from a single endpoint, VNF(s) 206 will halt forwarding traffic to that endpoint. As another example rule, if an endpoint is creating only embryonic connections, VNF(s) 206 will stop forwarding traffic. If there are retransmissions on network, VNF(s) 206 will remove the corresponding route and halt future traffic. If link congestion is detected on a route, VNF(s) 206 will halt won't use the route to send traffic for a set time period. If out of order TCP packets are detected, VNF(s) 206 will halt forwarding traffic.

VNF(s) 206 may exchange the blacklist and/or whitelist with other routing engines in the cloud exchange or in another cloud exchange (408). VNF(s) 206 may share blacklist data and/or whitelist data across the cloud exchange to any routing engine with an encrypted identity footprint.

Figure 4B:
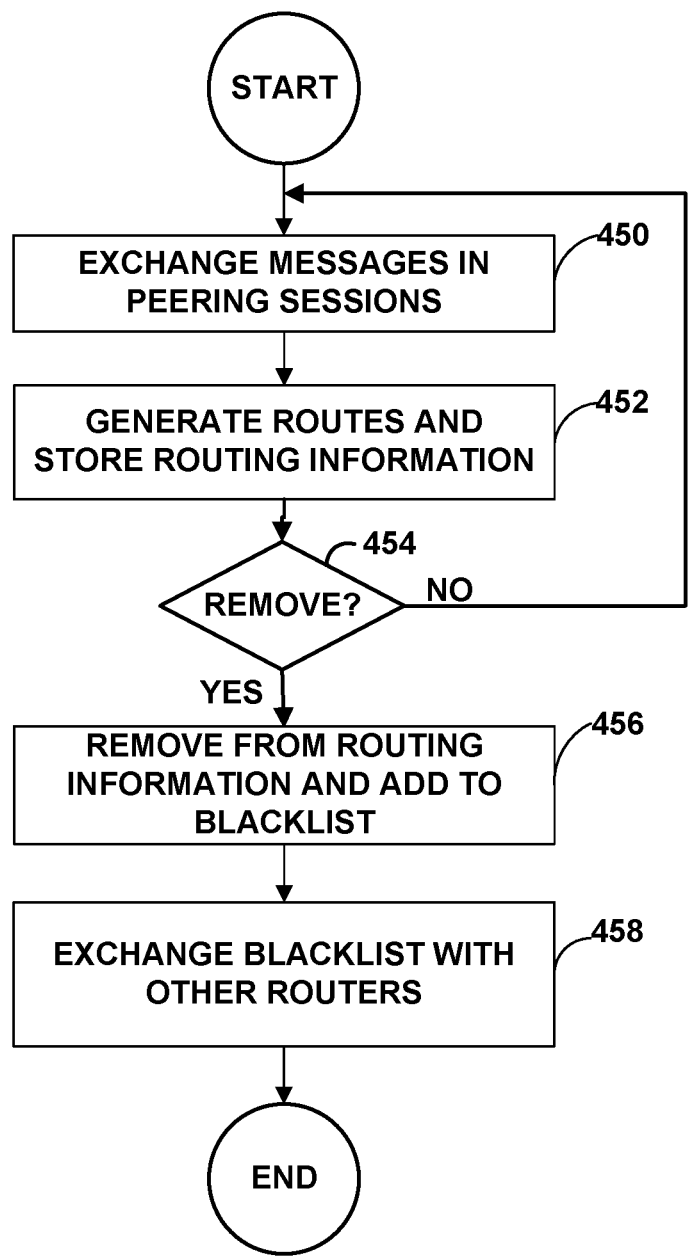
FIG. 4B is a flowchart illustrating example second operations for a routing engine according to techniques described herein.

FIG. 4B is a flowchart illustrating example second operations for a routing engine to perform real-time route authentication according to techniques described herein.

The following second operations are described with respect to VNF(s) 206 of FIG. 2 operating as an example routing engine. In some examples, VNF(s) 206 maintain various information (e.g., a map and routing information) of peer devices or simply "peers" (e.g., network devices such as routers having routing engines).

VNF(s) 206, in accordance with various networking protocols, establishes sessions with a peer and exchanges messages during that peering sessions (450). VNF(s) 206, in accordance with a network service, generates routes from exchanged message data and stores those routes in routing information (e.g., a routing table or Routing information Base (RIB)) (452). Typically, the routing information will be used to route packets.

Upon receiving a new route advertisement, VNF(s) 206 determine whether to remove the new route from any routing information (454). Based upon one or more indicia of illegitimate origination in the new route (YES BRANCH of 454), VNF(s) 206 may proceed to removing the new route from any routing information and add the new route to a blacklist (456). If the new route is determined to have no or insufficient indicia of illegitimate origination (NO BRANCH of 454), VNF(s) 206 may add the new route to a whilelist and return to waiting for a next new route (450). VNF(s) 206 may share blacklist data and/or whitelist data across other routing engines with encrypted identity footprint.

Figure 5:
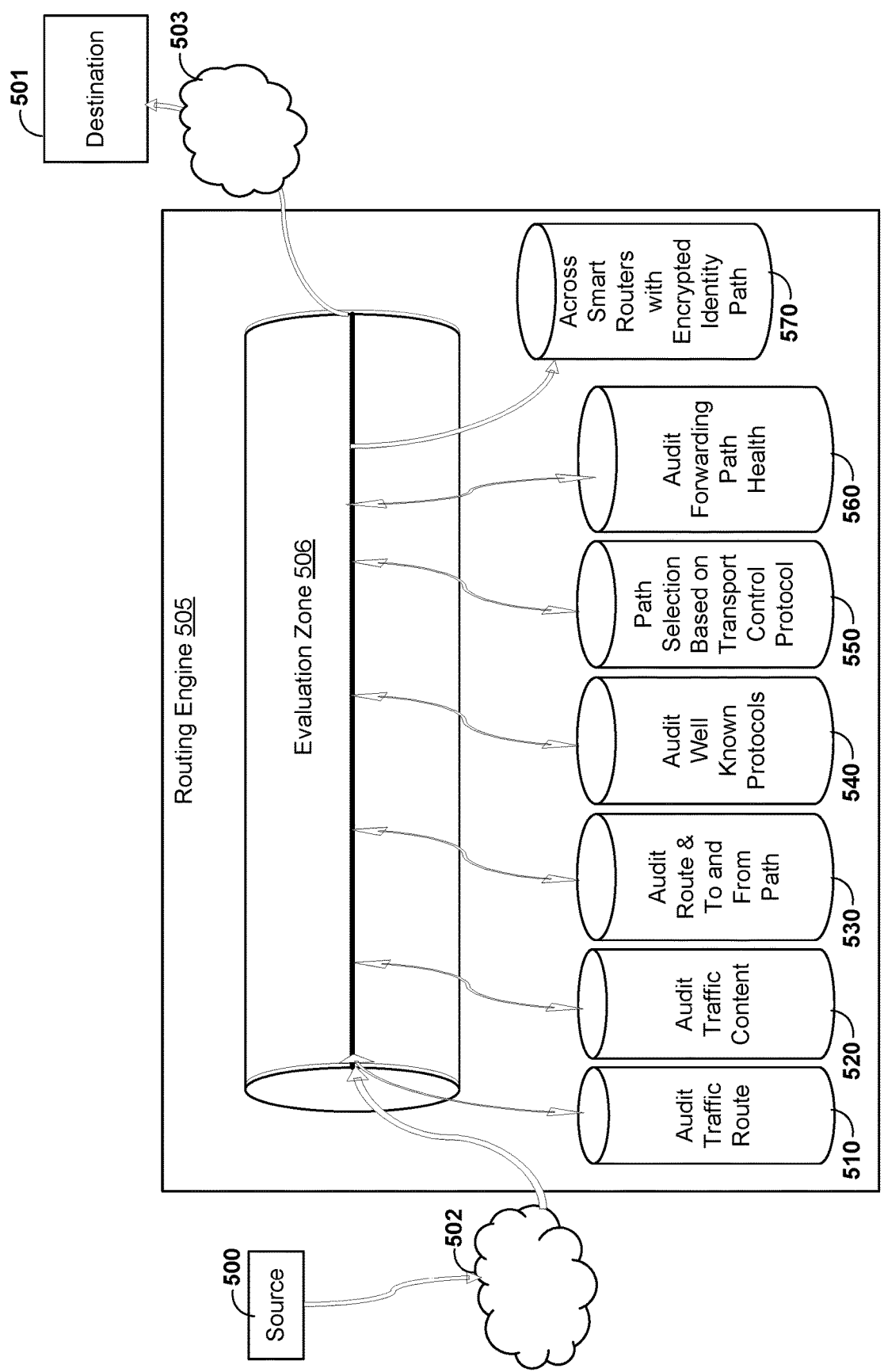
FIG. 5 is a conceptual diagram of an example routing engine between a source and a destination of an example interconnection system.

FIG. 5 is a conceptual diagram of an example routing engine between a source and a destination of an example interconnection system. The example interconnection system may include one or more data centers of which each data center provides services corresponding to an operating environment and NFVi for running network services on behalf of data center tenants. A data center provider may be entity in control of the example interconnection system.

Source 500 and destination 501 may refer to data center tenants residing in first network 502 and second network 503, respectively. These data center tenants may be customers of some service provided by the data center provider, such as compute/storage services, enterprise services, interconnection services, cloud-based services, Internet services, and/or the like. Source 500 and destination 501 may be any combination of the example customers described herein. One or more VNFs may be executed to run routing engine 505 (e.g., routing engine 124) to exchange packet communications between first network 502 and second network 503.

Routing engine 505 may be configured to verify routing information for any route using any of the techniques described herein. In some examples, origin information for the particular route (e.g., BGP route) identifies each hop between source 500 and destination 501 (e.g., AS path) and any one of those hops including the destination itself may be illegitimate. By evaluating origin information for the destination (and possibly one or more hops), routing engine 505 may identify the destination as an illegitimate endpoint. With sufficient time, routing engine 505 may be configured to prevent installation of the particular route in response to detecting the illegitimate endpoint. In other example, routing engine 505 may be configured to prevent transmission of a packet (e.g., an outgoing packet) along the particular route in response to detecting the illegitimate endpoint.

As illustrated in FIG. 5, routing engine 505 may invoke any combination of modular verification mechanisms to verify any particular route. Among the available verification mechanisms to any routing engine, FIG. 5 illustrates an audit traffic source mechanism 510, an audit traffic content mechanism 520, an audit route and to and from path mechanism 530, an audit well known connection protocols mechanism 540, a path selection based upon transport protocol mechanism 550, audit forwarding 550, and share data mechanism 570. Each verification mechanism performs a specific task focusing on a specific set of indicia of illegitimate origination.

If routing engine 505 applies audit traffic source 510 and audit traffic content 520 to existing routes traversed by outgoing packets in one or more samples of total network traffic. Sampling may capture packets in a certain time period or of certain sequence numbers. The sampling is separate from any routing, introducing no latency and guaranteeing security. Both mechanisms perform a series of tests; if any test identifies an illegitimate route, that test will prompt routing engine 505 to either halt operations (e.g., routing and forwarding) or raise flags to neighboring auditor mechanisms to fail pending network traffic and prevent installation of the any route installed on routing information base (RIB). As illustrated, audit route 530 is one neighboring auditor mechanism.

In some examples, audit traffic source 510 and audit traffic content 520 combine to form an audit traffic engine configured to run the above-mentioned series of tests on routing information describing a number of routes. The audit traffic engine may apply the series of tests one route at a time. In a first example test, an Asymmetric Traffic Test, the audit traffic engine determines whether the route's return path is same as outgoing path. If this test results in failure, the audit traffic engine communicates an alert to a data center administrator or the source 500 and, in some instances, perform remedy actions.

In a second example test, Traffic Loop Test, the audit traffic engine determines if there are any loops in the sampled network traffic by comparing current time-to-live (TTL) data with expected time-to-live (TTL) data for the data center. In a third example test, Traffic Legitimacy Test, the audit traffic engine determines whether source/destination IP is from known provider and from a legitimate host. In a fourth example test, Traffic Location Test, the audit traffic engine determines if traceroute of source &and destination validates location per IP address. In a fifth example test, Traffic Latency Test, the audit traffic engine determines whether latency matches expected location. In a sixth example test, Traffic Fragmentation Test, the audit traffic engine determines if packets are fragmented and if so, notifies routing engines closest to source 500 and raises a flag to fix maximum transmission unit (MTU) issues. In a seventh example test, Link Under-Utilized through Transmission Control Protocol (TCP) test, audit traffic engine determines if links are under-utilized, for instance, by determining whether a window size setting for Transmission Control Protocol (TCP) packets results in utilizing the pipe. Otherwise, audit traffic engine raises a flag for improvements. In an eighth example test, Traffic Path congestion Test, the audit traffic engine determines whether traffic has retransmissions.

Lastly, the audit traffic engine may perform Hop by Hop Integrity Tests without running encryption or nonce methods. Each audit traffic engine maintains traffic originator and receiver information in a shared storage location (e.g., an archive file). Each routing engine can view this shared information. In response to any active traffic source/destination identity or data center entry/exit point changes, or unexpected latency increase event occurrences, the audit traffic engine may perform additional tests to detect a malicious host or sniffer presence.

For the audit route and to and from path mechanism 530, routing engine 505 may invoke an audit route engine to apply a series of test on behalf of this mechanism 530. The following series of tests may be performed in sequence order or, alternatively, in any order. Routing engine 505 may invoke these tests prior to installing a new or modified route. If any test results in failure, the audit route engine halts or otherwise prevents installation of the new or modified route into RIB.

In an example first test, Legitimacy Test, the audit route engine evaluates a route registry to determine whether a valid route object has been registered for the route. In an example second test, Location Test, the audit route engine evaluates a route to determine whether the route has been advertised from expected location. In an example third test, Latency Test, the audit route engine determines whether the route's latency is valid per expected location. In an example fourth test, Asymmetric Routing Test, the audit route engine determines whether BGP routers are converged to same entry & exit point for each route to the data center. In an example fifth test, Routing Loop Test, the audit route engine verifies expected vs actual hops in both incoming/exit points across the data center & also match time to live (TTL) to ensure loop. In an example sixth test, MTU Test, the audit route engine determines whether MTUs across path is as expected else notify other routing engines about path MTU discovery. Lastly, the audit route engine validates routing updates from other routing engines. The updates to/from each routing engine have an attached secured footprint. These footprints may identify other routing engines to determine whether updates are received from legitimate router or not.

Audit well-known connection protocols mechanism 540 may classify outgoing packets of the sampled network traffic by their connection protocols. By accumulating tenant and flow-related statistics, audit well-known connection protocols mechanism 540 may identify characteristic behaviors amongst multiple protocols. If any outgoing packet deviates from the behaviors of its corresponding protocol, audit well-known connection protocols mechanism 540 raises a flag or an exception for routing engine 505 to catch. Routing engine 505, in response, may drop the packet and remove the packet's route from RIB, resulting in the blacklisting of the route.

Path selection based upon transport protocol (TCP/UDP) mechanism 550 is configured to verify that an outgoing packet's path based upon the transport protocol. TCP protocol data units (e.g., packets or segments) perform worst on congested networks and require dedicated routes. Any TCP packet caught traversing a congested route is deviating from known established behavior. UDP traffic is considered low priority and often takes different/cheaper routes. Any UDP packet caught traversing an expensive route is deviating from known established behavior for the UDP protocol. In both instances, the congested route and the expensive route are labelled as having illegitimate origination and a source or destination that is an illegitimate endpoint. The source may be in an internal network within the data center, such as source 500 in first network 502 and the destination may be in an external network outside of the data center, such as destination 501 in second network 503.

Audit forwarding path health mechanism 560 may collect tenant and flow-related statistics and other historical data to determine an operation state of each hop in second network 503 between routing engine 505 and destination 501. Share data mechanism 570 may store blacklisted routes or whitelisted routes in a shared stored location that is accessible by other routing engines enabled with real-time route authentication for outgoing packet origination.

In some examples, routing engine 505 may be configured with logic operative to train a machine learning model to have a feature set configured to identify indicia of illegitimate origination. By training, the machine learning model may learn conditional probabilities or functional parameters that enable the feature set to accurately, efficiently, and with low latency determine whether a source or a destination is a legitimate endpoint for packet transmissions. Routing engine 505 may leverage one or more of the above-mentioned mechanisms to process tenant and flow-related statistics and other historical datasets for use in the training of the machine learning model. These statistics and historical datasets may provide training data for supervised and unsupervised learning.

Techniques described herein may rely on certain conditions to determine which of the above-mentioned mechanisms to apply. In response to a new or modified route, routing engine 505 may invoke the audit route and to and from path mechanism 530. In response to forwarding network traffic without sampling, none of the mechanisms are applied.

Techniques described herein overcome a number of shortcomings in routing engines, and with respect to firewalls, some techniques provide a new evaluation method that is unavailable in any firewall. Firewalls, residing on a network edge, are not situated in the middle of an interconnection between networks, which makes them incapable of evaluating routes, sources/destinations, or intermediate path or detecting sniffer in one or both networks in contrast to routing engine 505.

Firewalls do not and cannot perform tests mentioned such as any of the above-mentioned tests for audit traffic engine and audit route engine. This is because firewalls do not have a complete network hop by hop overview. Firewalls are configured to apply evaluation methods to incoming traffic from outside world and do not have an evaluation method for outgoing traffic. Internal traffic origination does not invoke any of the firewall's evaluation method.

However, in zero trust model, a goal is to evaluate traffic from both directions and distribute security across fabric components. Each device on network should not rely on end devices and firewalls instead be mindful while forwarding traffic since their placement on the network gives them more visibility and less overhead on overall network resources. Once a routing engine, such as routing engine 505, detects a possible threat, the routing engine updates every other engine through a shared jar or archive file. If other auditor engines are aware if a source is flagged already, they can better handle the situation and be stricter while forwarding traffic If an IP address of a source such as source 500 or a destination such as destination 501 is blacklisted, the routing engine maintains a suspicious history in a shared jar or archive file. If source 500 is the source (e.g., A-side of an interconnection), routing engine 505 is in an internal network with source 500 and communicates with destination 501 residing in an external network (e.g., Z-side). Source Media Access Control (MAC) information at entry point to the internal network (e.g., source 500) is stored in a separate jar that is accessibly by other routing engines. By sharing, routing engine(s) at the destination 501 also have a complete identity of source MAC. By sharing mitigation information and blacklisted source and AS path information among routing engines in the cloud exchanges, the cloud exchanges can proactively reduce further attacks at different locations in the cloud exchange fabric.

Implementing the techniques described herein confers upon routing engine 505 (and possibly the routing engine(s) at the destination 501) a number of benefits, in general, without being specific to firewalls. Mainly, routing engine 505 becomes aware of what is being routed: Malicious traffic attempts are killed right near source of origination; bad routes won't be able to misguide router; and good routes are not dropped or removed from routing information (e.g., RIB). Routing engine 505 avoids negative consequences from the travelling of malicious traffic up to destination 501 blindly as well as from unnecessary link consumption. Traffic is forwarded intelligently based on type of traffic and link type to route efficiently. Congestion can be mitigated right between routing engines such that if a host at either source 500 or destination 501 starts creating TCP connection, routing engine doesn't have to kick congestion control mechanism. As another benefit, a proxy connection from firewall is no longer needed to mitigate a malicious attack by a fraudster. In addition, new or modified equipment and/or components (e.g., firewall) are needed. Some equipment and/or components (e.g., firewall) may shift attention to focus on other important application-based tasks. As yet another benefit, hackers and other fraudsters will find it extremely difficult to surreptitiously gain entry into source 500 or destination 501; as one reason, once source of illegitimate traffic or route is blacklisted, that information will be shared across fabric and other routing engines close doors proactively for that particular source.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system for one or more cloud exchanges, the computing system comprising:
    processing circuitry coupled to a memory; and
    a routing engine stored in the memory and configured for execution by the processing circuitry, wherein the routing engine is operative to:
        establish sessions between a first network and a second network interconnected over the one or more cloud exchanges to exchange border gateway protocol (BGP) route advertisements comprising routing information for routes from the first network to the second network; and
        verify, for each of the BGP route advertisements and before the BGP route advertisements are installed, routing information of the BGP route advertisements, wherein to verify the routing information of the BGP route advertisements, the routing engine is operative to:
            determine, based on an autonomous system (AS) path attribute of a corresponding BGP route advertisement of the BGP route advertisements, origin information of a route of the corresponding BGP route advertisement, wherein the origin information comprises a geographical location of origination of the route of the corresponding BGP route advertisement;
            evaluate the origin information of the route of the corresponding BGP route advertisement for indicia of illegitimate origination of the route of the corresponding BGP route advertisement, and
            in response to detecting indicia of illegitimate origination of the route of the corresponding BGP route advertisement, drop the route of the corresponding BGP route advertisement.

2. The computing system of claim 1, wherein the routing engine is further operative to determine, based on outgoing packet transmissions for the route of the corresponding BGP route advertisement, origin information or generate statistical information.

3. The computing system of claim 2, wherein the routing engine is further operative to:
    classify the route of the corresponding BGP route advertisement as a legitimate route or an illegitimate route based upon data extracted from the outgoing packet transmissions for the route; and
    add, based on the classification of the route of the corresponding BGP route advertisement, the route of the corresponding BGP route advertisement to a blacklist or a whitelist.

4. The computing system of claim 1, wherein the routing engine is further operative to compare origin information of the route of the corresponding BGP route advertisement to a blacklist or a whitelist.

5. The computing system of claim 1, wherein the routing engine is further operative to compare an address of an endpoint at the first network or an endpoint at the second network of outgoing packet transmissions for the route of the corresponding BGP route advertisement with a blacklist or a whitelist.

6. The computing system of claim 5, wherein the routing engine is further operative to train a machine learning model having a feature set for determining whether the endpoint at the first network or the endpoint at the second network is a legitimate endpoint of the outgoing packet transmissions.

7. The computing system of claim 1, wherein the routing engine is further operative to prevent transmission of the corresponding route in response to detecting indicia of illegitimate origination of the corresponding route.

8. The computing system of claim 1, wherein the routing engine is further operative to prevent installation of the corresponding route in response to detecting indicia of illegitimate origination of the corresponding route.

9. The computing system of claim 1, wherein evaluating origin information of the corresponding route comprises identifying each autonomous system for the corresponding route.

10. The computing system of claim 1, wherein the first network is an internal network and the second network is an external network.

11. A method of a computing system, the method comprising:
    establishing, by a routing engine of the computing system, sessions between a first network and a second network interconnected over one or more cloud exchanges to exchange border gateway protocol (BGP) route advertisements comprising routing information for routes from the first network to the second network; and
    verifying, by the routing engine of the computing system and for each of the BGP route advertisements and before the BGP route advertisements are installed, the routing information of the BGP route advertisements, wherein to verify the routing information of the BGP route advertisements comprises:
        determining, based on an autonomous system (AS) path attribute of a corresponding BGP route advertisement of the BGP route advertisements, origin information of a route of the corresponding BGP route advertisements, wherein the origin information comprises a geographical location of origination of the route of the corresponding BGP route advertisement;
        evaluating the origin information of the route of the corresponding BGP route advertisement for indicia of illegitimate origination of the route of the corresponding BGP route advertisement, and
        in response to detecting indicia of illegitimate origination of the route of the corresponding BGP route advertisement, dropping the route of the corresponding BGP route advertisement.

12. The method of claim 11, further comprising determining, based on outgoing packet transmissions for the route of the corresponding BGP route advertisement, origin information or generate statistical information.

13. The method of claim 11, further comprising:
classifying the route of the corresponding BGP route advertisement as a legitimate route or an illegitimate route based upon data extracted from the outgoing packet transmissions for the route; and
adding, based on the classification of the route of the corresponding BGP route advertisement, the route of the corresponding BGP route advertisement to a blacklist or a whitelist.

14. The method of claim 11, further comprising comparing origin information of the route of the corresponding BGP route advertisement to a blacklist or a whitelist.

15. The method of claim 11, further comprising performing at least one of preventing an installation of the route of the corresponding BGP route advertisement or preventing a transmission of packets along the route of the corresponding BGP route advertisement.

16. The method of claim 11, further comprising storing a blacklist or a whitelist in a storage location accessible by another routing engine.

17. An interconnection system comprising:
at least one cloud exchange, the at least one cloud exchange including one or more routing engines including processing circuitry and configured to:
establish sessions between a first network and a second network interconnected over the at least one cloud exchange to exchange border gateway protocol (BGP) route advertisements comprising routing information for routes from the first network to the second network; and
verify, for each of the BGP route advertisements and before the BGP route advertisements are installed, routing information of the BGP route advertisements, wherein to verify the routing information of the BGP route advertisements, the processing circuitry is configured to:
determine, based on an autonomous system (AS) path attribute of a corresponding BGP route advertisement of the BGP route advertisements, origin information of a route of the corresponding BGP route advertisement, wherein the origin information comprises a geographical location of origination of the route of the corresponding BGP route advertisement,
evaluating origin information of the route of the corresponding BGP route advertisement for indicia of illegitimate origination of the route of the corresponding BGP route advertisement, and
in response to detecting indicia of illegitimate origination of the route of the corresponding BGP route advertisement, dropping the route of the corresponding BGP route advertisement.

18. The interconnection system of claim 17, wherein the one or more routing engines are further configured to determine, based on outgoing packet transmissions for the route of the corresponding BGP route advertisement, origin information or generate statistical information.

19. The interconnection system of claim 17, wherein the one or more routing engines are further configured to:
classify the route of the corresponding BGP route advertisement as a legitimate route or an illegitimate route based upon data extracted from outgoing packet transmissions for the route; and
add, based on the classification of the route of the corresponding BGP route advertisement, the route of the corresponding BGP route advertisement to a blacklist or a whitelist.

20. The interconnection system of claim 17,
wherein the one or more routing engines are configured to exchange a blacklist with each other, and
wherein the one or more routing engines are configured to compare origin information of the corresponding route to the blacklist.

* * * * *